(12) United States Patent
Zhang et al.

(10) Patent No.: US 11,665,680 B2
(45) Date of Patent: May 30, 2023

(54) CONFIGURATIONS FOR A CARRIER OVERLAPPING MULTIPLE UNLICENSED BANDS

(71) Applicant: QUALCOMM Incorporated, San Diego, CA (US)

(72) Inventors: Xiaoxia Zhang, San Diego, CA (US); Gene Fong, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/224,055

(22) Filed: Apr. 6, 2021

(65) Prior Publication Data
US 2021/0410140 A1      Dec. 30, 2021

Related U.S. Application Data

(60) Provisional application No. 63/045,597, filed on Jun. 29, 2020.

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC ............ H04W 72/0453; H04W 72/14; H04W 72/1289; H04W 52/0216; H04W 52/0238; H04W 52/0245; Y02D 30/70; H04L 5/0091; H04L 27/0006; H04L 5/0044
See application file for complete search history.

(56) References Cited

U.S. PATENT DOCUMENTS

2017/0048718 A1 *   2/2017   Kim ..................... H04L 1/1861
2017/0195979 A1     7/2017   Nakamura et al.
2019/0132882 A1 *   5/2019   Li ....................... H04W 74/0816
(Continued)

FOREIGN PATENT DOCUMENTS

WO    WO-2018138328 A1 *   8/2018   ............. H04L 67/12

OTHER PUBLICATIONS

International Search Report and Written Opinion—PCT/US2021/028692—ISA/EPO—dated Jul. 16, 2021.
(Continued)

*Primary Examiner* — Yu-Wen Chang
(74) *Attorney, Agent, or Firm* — Holland & Hart LLP

(57) ABSTRACT

Methods, systems, and devices for wireless communications are described. A user equipment (UE) may receive a plurality regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements. The UE may identify, from the plurality of regulation requirement parameters, a set of regulation requirement parameters for an uplink transmission based at least in part on whether a set of frequency resources for the uplink transmission overlaps with the first unlicensed band and the second unlicensed band. The UE may transmit the uplink transmission using the set of regulation requirement parameters.

25 Claims, 21 Drawing Sheets

(56) References Cited

U.S. PATENT DOCUMENTS

| | | | |
|---|---|---|---|
| 2019/0223119 A1* | 7/2019 | Takahashi | H04B 1/04 |
| 2019/0253976 A1* | 8/2019 | Pelletier | H04W 52/146 |
| 2020/0059929 A1 | 2/2020 | Jones | |
| 2021/0176753 A1* | 6/2021 | Higgins | H04W 4/38 |
| 2022/0014314 A1* | 1/2022 | Wang | H04L 5/0053 |
| 2022/0240284 A1* | 7/2022 | Zhou | H04W 72/1273 |

OTHER PUBLICATIONS

Qualcomm Incorporated: "eLAA Specification Changes for UL Operation", 3GPP Draft, R4-162652, 3GPP TSG-RAN WG4 #78bis, 3rd Generation Partnership Project (3GPP), Mobile Competence Centre, 650, Route Des Lucioles, F-06921, Sophia-Antipolis Cedex, France, vol. RAN WG4, No. San Jose del Cabo, Apr. 11, 2016-Apr. 15, 2016, Apr. 1, 2016 (Apr. 1, 2016), XP051084594, pp. 1-6, Retrieved from the Internet: URL:http://www.3gpp.org/ftp/tsg_ran/WG4_Radio/TSGR4_78Bis/Docs/ [retrieved on Apr. 1, 2016] Section 2.

"RAN4#80bis Meeting Report", 3GPP Draft; R4-1609011, 3GPP TSG-RAN WG4 Meeting #81, 3rd Generation Partnership Project (3GPP), Mobile Competence Centre, 650, Route Des Lucioles, F-06921 Sophia-Antipolis Cedex, France, vol. RAN WG4, No. Reno, Nevada, USA, Nov. 14, 2016-Nov. 18, 2016, Nov. 17, 2016 (Nov. 17, 2016), XP051194406, 644 pages, Retrieved from the Internet: URL: http://www.3gpp.org/ftp/tsg_ran/WG4_Radio/TSGR4_80Bis/Report/ [retrieved on Nov. 17, 2016],Section 8.18.2.2.

\* cited by examiner

CONFIGURATIONS FOR A CARRIER OVERLAPPING MULTIPLE UNLICENSED BANDS

CROSS REFERENCE

The present Application for Patent claims the benefit of U.S. Provisional Patent Application No. 63/045,597 by ZHANG et al., entitled "CONFIGURATIONS FOR A CARRIER OVERLAPPING MULTIPLE UNLICENSED BANDS," filed Jun. 29, 2020, assigned to the assignee hereof, and expressly incorporated by reference herein.

FIELD OF TECHNOLOGY

The following relates generally to wireless communications and more specifically to configurations for a carrier overlapping multiple unlicensed bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Different unlicensed spectrum bands (e.g., Unlicensed National Information Infrastructure (U-NII) bands) may be associated with different sets of regulation requirements. In some wireless communications systems, a UE may be configured with an unlicensed carrier associated with a single set of regulation requirements. However, these limitations may limit the flexibility and utility of the unlicensed carriers.

SUMMARY

The described techniques relate to improved methods, systems, devices, and apparatuses that support configurations for a carrier overlapping multiple unlicensed bands. Generally, the described techniques provide for resource allocation of unlicensed carriers which span multiple unlicensed bands or at least portions of multiple unlicensed bands. A user equipment (UE) may receive a resource allocation for an unlicensed carrier (e.g., NR-U carrier) which spans a first unlicensed band (e.g., first Unlicensed National Information Infrastructure (U-NII) band) and a second unlicensed band (e.g., second U-NII band). The first and second unlicensed bands may be associated with different sets of requirements (e.g., maximum power requirements, regulatory requirements). The UE may additionally receive one or more sets of regulation requirement parameters (e.g., network signaling (NS) values) corresponding to the unlicensed carrier. In some aspects, the UE may receive a single NS value which indicates parameters which correspond to the most stringent requirements across the first unlicensed band and the second unlicensed band. Additionally or alternatively, the UE may receive multiple NS values associated with multiple resource subsets (e.g., subbands, bandwidth parts (BWPs), a set of resources allocated for an uplink transmission) of the unlicensed carrier. When performing an uplink transmission, the UE may apply a set of parameters associated with the respective unlicensed band if the respective resource subset (e.g., subband, BWP) is disposed completely within the first or second unlicensed band. Alternatively, in cases where the respective resource subset (e.g., subband, BWP) is disposed within both the first and second unlicensed bands, the UE may apply a subset of parameters associated with the first unlicensed band and the second unlicensed band (e.g., a set of the most stringent parameters between with the first subband and the second subband) when performing an uplink transmission. The set of the most stringent parameters may include the parameters associated with the first or second subbands, or a hybrid of the most stringent parameters associated with the first and second subbands. By enabling a single unlicensed carrier to be associated with multiple NS values, techniques described herein may lead to improved communication resource utilization within unlicensed spectrum.

A method of wireless communications at a UE is described. The method may include receiving a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements, identifying, from the set of regulation requirement parameters, a set of regulation requirement parameters for an uplink transmission based on whether a set of frequency resources for the uplink transmission overlaps with the first unlicensed band and the second unlicensed band, and transmitting the uplink transmission using the set of regulation requirement parameters.

An apparatus for wireless communications at a UE is described. The apparatus may include a processor, memory coupled with the processor, and instructions stored in the memory. The instructions may be executable by the processor to cause the apparatus to receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements, identify, from the set of regulation requirement parameters, a set of regulation requirement parameters for an uplink transmission based on whether a set of frequency resources for the uplink transmission overlaps with the first unlicensed band and the second unlicensed band, and transmit the uplink transmission using the set of regulation requirement parameters.

Another apparatus for wireless communications at a UE is described. The apparatus may include means for receiving a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements, identifying, from the set of regulation requirement parameters, a set of regulation requirement parameters for an uplink transmission based on whether a set of frequency resources for the uplink transmission overlaps with the first unlicensed band and the second unlicensed band, and transmitting the uplink transmission using the set of regulation requirement parameters.

A non-transitory computer-readable medium storing code for wireless communications at a UE is described. The code may include instructions executable by a processor to receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements, identify, from the set of regulation requirement parameters, a set of regulation requirement parameters for an uplink transmission based on whether a set of frequency resources for the uplink transmission overlaps with the first unlicensed band and the second unlicensed band, and transmit the uplink transmission using the set of regulation requirement parameters.

In some examples of the method, apparatuses, and non-transitory computer-readable medium described herein, receiving the set of regulation requirement parameters may include operations, features, means, or instructions for receiving a first regulation requirement parameter set associated with the first unlicensed band, and receiving a second regulation requirement parameter set associated with the second unlicensed band.

Some examples of the method, apparatuses, and non-transitory computer-readable medium described herein may further include operations, features, means, or instructions for determining that the set of frequency resources for the uplink transmission corresponds to a configured bandwidth part that may be entirely within the first unlicensed band or entirely within the second unlicensed band, and selecting the first regulation requirement parameter set or the second regulation requirement parameter set as the set of regulation requirement parameters for the uplink transmission based on the configured bandwidth part being entirely within the first unlicensed band or entirely within the second unlicensed band.

Some examples of the method, apparatuses, and non-transitory computer-readable medium described herein may further include operations, features, means, or instructions for determining that the set of frequency resources for the uplink transmission corresponds to a configured bandwidth part that overlaps with the first unlicensed band and the second unlicensed band, and selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based on the configured bandwidth part overlapping with the first unlicensed band and the second unlicensed band.

Some examples of the method, apparatuses, and non-transitory computer-readable medium described herein may further include operations, features, means, or instructions for determining that the set of frequency resources for the uplink transmission may be entirely within the first unlicensed band or entirely within the second unlicensed band, and selecting the first regulation requirement parameter set or the second regulation requirement parameter set as the set of regulation requirement parameters for the uplink transmission based on the set of frequency resources for the uplink transmission being entirely within the first unlicensed band or entirely within the second unlicensed band.

Some examples of the method, apparatuses, and non-transitory computer-readable medium described herein may further include operations, features, means, or instructions for determining that the set of frequency resources for the uplink transmission overlaps with the first unlicensed band and the second unlicensed band, and selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based on the set of frequency resources for the uplink transmission overlapping with the first unlicensed band and the second unlicensed band.

In some examples of the method, apparatuses, and non-transitory computer-readable medium described herein, receiving the set of regulation requirement parameters may include operations, features, means, or instructions for receiving a first regulation requirement parameter set associated with a first configured bandwidth part of the unlicensed carrier, and receiving a second regulation requirement parameter set associated with a second configured bandwidth part of the unlicensed carrier.

Some examples of the method, apparatuses, and non-transitory computer-readable medium described herein may further include operations, features, means, or instructions for determining that the set of frequency resources for the uplink transmission corresponds to the first configured bandwidth part or the second configured bandwidth part, and selecting the first regulation requirement parameter set or the second regulation requirement parameter set as the set of regulation requirement parameters for the uplink transmission based on the set of frequency resources for the uplink transmission corresponding to the first configured bandwidth part or the second configured bandwidth part.

Some examples of the method, apparatuses, and non-transitory computer-readable medium described herein may further include operations, features, means, or instructions for determining that the set of frequency resources for the uplink transmission may be entirely within the first unlicensed band or entirely within the second unlicensed band, and selecting, from the first set of regulation requirement parameter sets and the second set of regulation requirement parameter sets, a regulation requirement parameter set corresponding to the first unlicensed band or the second unlicensed band as the set of regulation requirement parameters for the uplink transmission based on the set of frequency resources for the uplink transmission being entirely within the first unlicensed band or entirely within the second unlicensed band.

Some examples of the method, apparatuses, and non-transitory computer-readable medium described herein may further include operations, features, means, or instructions for determining that the set of frequency resources for the uplink transmission overlaps with the first unlicensed band and the second unlicensed band, and selecting, from the first set of regulation requirement parameter sets and the second set of regulation requirement parameter sets, a subset of regulation requirement parameters having a strictest requirement between the first regulation requirement parameter set and the second regulation requirement parameter set as the set of regulation requirement parameters for the uplink transmission based on the set of frequency resources for the uplink transmission overlapping with the first unlicensed band and the second unlicensed band.

Some examples of the method, apparatuses, and non-transitory computer-readable medium described herein may further include operations, features, means, or instructions for receiving, from a base station, a system information block (SIB) including an indication of the set of regulation requirement parameters.

In some examples of the method, apparatuses, and non-transitory computer-readable medium described herein, the set of regulation requirement parameters includes an effective isotropically radiated power (EIRP) value, a power spectral density (PSD) power value, a maximum power reduction (MPR) value, a UE emission value, or any combination thereof.

In some examples of the method, apparatuses, and non-transitory computer-readable medium described herein, the first unlicensed band, the second unlicensed band, or both, includes an U-NII band.

A method of wireless communications at a UE is described. The method may include receiving a resource allocation for an unlicensed carrier which spans at least a portion of a first unlicensed band associated with a first set of regulation requirements and at least a portion of a second unlicensed band associated with a second set of regulation requirements, receiving an uplink resource configuration indicating a set of frequency resources for an uplink transmission and a set of regulation requirement parameters for the uplink transmission, and transmitting the uplink transmission using the set of regulation requirement parameters.

An apparatus for wireless communications at a UE is described. The apparatus may include a processor, memory coupled with the processor, and instructions stored in the memory. The instructions may be executable by the processor to cause the apparatus to receive a resource allocation for an unlicensed carrier which spans at least a portion of a first unlicensed band associated with a first set of regulation requirements and at least a portion of a second unlicensed band associated with a second set of regulation requirements, receive an uplink resource configuration indicating a set of frequency resources for an uplink transmission and a set of regulation requirement parameters for the uplink transmission, and transmit the uplink transmission using the set of regulation requirement parameters.

Another apparatus for wireless communications at a UE is described. The apparatus may include means for receiving a resource allocation for an unlicensed carrier which spans at least a portion of a first unlicensed band associated with a first set of regulation requirements and at least a portion of a second unlicensed band associated with a second set of regulation requirements, receiving an uplink resource configuration indicating a set of frequency resources for an uplink transmission and a set of regulation requirement parameters for the uplink transmission, and transmitting the uplink transmission using the set of regulation requirement parameters.

A non-transitory computer-readable medium storing code for wireless communications at a UE is described. The code may include instructions executable by a processor to receive a resource allocation for an unlicensed carrier which spans at least a portion of a first unlicensed band associated with a first set of regulation requirements and at least a portion of a second unlicensed band associated with a second set of regulation requirements, receive an uplink resource configuration indicating a set of frequency resources for an uplink transmission and a set of regulation requirement parameters for the uplink transmission, and transmit the uplink transmission using the set of regulation requirement parameters.

In some examples of the method, apparatuses, and non-transitory computer-readable medium described herein, the uplink transmission includes a dynamically configured physical uplink shared channel transmission, and where the uplink resource configuration includes an uplink grant.

In some examples of the method, apparatuses, and non-transitory computer-readable medium described herein, the uplink transmission includes a semi-statically configured physical uplink shared channel transmission, and where the uplink resource configuration includes a configured grant or an activation downlink control information message.

In some examples of the method, apparatuses, and non-transitory computer-readable medium described herein, the uplink transmission includes an uplink control message or a reference signal, and where the uplink resource configuration includes a resource configuration message for the uplink control message or the reference signal.

In some examples of the method, apparatuses, and non-transitory computer-readable medium described herein, the set of regulation requirement parameters includes an EIRP, a PSD power value, an MPR value, a UE emission value, or any combination thereof.

In some examples of the method, apparatuses, and non-transitory computer-readable medium described herein, the first unlicensed band, the second unlicensed band, or both, includes an U-NII band.

A method of wireless communications at a base station is described. The method may include transmitting, to a UE, a resource allocation for an unlicensed carrier which spans at least a portion of a first unlicensed band associated with a first set of regulation requirements and at least a portion of a second unlicensed band associated with a second set of regulation requirements, transmitting, to the UE, an uplink resource configuration indicating a set of frequency resources for an uplink transmission and a set of regulation requirement parameters for the uplink transmission, and receiving, from the UE, the uplink transmission using the set of regulation requirement parameters.

An apparatus for wireless communications at a base station is described. The apparatus may include a processor, memory coupled with the processor, and instructions stored in the memory. The instructions may be executable by the processor to cause the apparatus to transmit, to a UE, a resource allocation for an unlicensed carrier which spans at least a portion of a first unlicensed band associated with a first set of regulation requirements and at least a portion of a second unlicensed band associated with a second set of regulation requirements, transmit, to the UE, an uplink resource configuration indicating a set of frequency resources for an uplink transmission and a set of regulation requirement parameters for the uplink transmission, and receive, from the UE, the uplink transmission using the set of regulation requirement parameters.

Another apparatus for wireless communications at a base station is described. The apparatus may include means for transmitting, to a UE, a resource allocation for an unlicensed carrier which spans at least a portion of a first unlicensed band associated with a first set of regulation requirements and at least a portion of a second unlicensed band associated with a second set of regulation requirements, transmitting, to the UE, an uplink resource configuration indicating a set of frequency resources for an uplink transmission and a set of regulation requirement parameters for the uplink transmission, and receiving, from the UE, the uplink transmission using the set of regulation requirement parameters.

A non-transitory computer-readable medium storing code for wireless communications at a base station is described. The code may include instructions executable by a processor to transmit, to a UE, a resource allocation for an unlicensed carrier which spans at least a portion of a first unlicensed band associated with a first set of regulation requirements and at least a portion of a second unlicensed band associated with a second set of regulation requirements, transmit, to the UE, an uplink resource configuration indicating a set of frequency resources for an uplink transmission and a set of regulation requirement parameters for the uplink transmission, and receive, from the UE, the uplink transmission using the set of regulation requirement parameters.

In some examples of the method, apparatuses, and non-transitory computer-readable medium described herein, the uplink transmission includes a dynamically configured physical uplink shared channel transmission, and where the uplink resource configuration includes an uplink grant.

In some examples of the method, apparatuses, and non-transitory computer-readable medium described herein, the uplink transmission includes a semi-statically configured physical uplink shared channel transmission, and where the uplink resource configuration includes a configured grant or an activation downlink control information message.

In some examples of the method, apparatuses, and non-transitory computer-readable medium described herein, the uplink transmission includes a an uplink control message or a reference signal, and where the uplink resource configuration includes a resource configuration message for the uplink control message or the reference signal.

In some examples of the method, apparatuses, and non-transitory computer-readable medium described herein, the set of regulation requirement parameters includes an EIRP, a PSD power value, an MPR value, a UE emission value, or any combination thereof.

In some examples of the method, apparatuses, and non-transitory computer-readable medium described herein, the first unlicensed band, the second unlicensed band, or both, includes an U-NII band.

A method of wireless communications at a base station is described. The method may include determining, from a first set of regulation requirements associated with a first unlicensed band and a second set of regulation requirements associated with a second unlicensed band, a subset of regulation requirement parameters having a strictest requirement between the first set of regulation requirements and the second set of regulation requirements, transmitting, to a UE, a resource allocation for an unlicensed carrier which spans at least a portion of the first unlicensed band and at least a portion of the second unlicensed band, transmitting, to the UE, an indication of the subset of regulation requirement parameters for uplink transmissions on the unlicensed carrier, and receiving, from the UE, an uplink transmission using the subset of regulation requirement parameters.

An apparatus for wireless communications at a base station is described. The apparatus may include a processor, memory coupled with the processor, and instructions stored in the memory. The instructions may be executable by the processor to cause the apparatus to determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements, transmit, to a UE, a resource allocation for an unlicensed carrier which spans at least a portion of the first unlicensed band and at least a portion of the second unlicensed band, transmit, to the UE, an indication of the subset of regulation requirement parameters for uplink transmissions on the unlicensed carrier, and receive, from the UE, an uplink transmission using the subset of regulation requirement parameters.

Another apparatus for wireless communications at a base station is described. The apparatus may include means for determining, from a first set of regulation requirements associated with a first unlicensed band and a second set of regulation requirements associated with a second unlicensed band, a subset of regulation requirement parameters having a strictest requirement between the first set of regulation requirements and the second set of regulation requirements, transmitting, to a UE, a resource allocation for an unlicensed carrier which spans at least a portion of the first unlicensed band and at least a portion of the second unlicensed band, transmitting, to the UE, an indication of the subset of regulation requirement parameters for uplink transmissions on the unlicensed carrier, and receiving, from the UE, an uplink transmission using the subset of regulation requirement parameters.

A non-transitory computer-readable medium storing code for wireless communications at a base station is described. The code may include instructions executable by a processor to determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements, transmit, to a UE, a resource allocation for an unlicensed carrier which spans at least a portion of the first unlicensed band and at least a portion of the second unlicensed band, transmit, to the UE, an indication of the subset of regulation requirement parameters for uplink transmissions on the unlicensed carrier, and receive, from the UE, an uplink transmission using the subset of regulation requirement parameters.

In some examples of the method, apparatuses, and non-transitory computer-readable medium described herein, the subset of regulation requirement parameters includes an EIRP, a PSD power value, an MPR value, a UE emission value, or any combination thereof.

In some examples of the method, apparatuses, and non-transitory computer-readable medium described herein, the first unlicensed band, the second unlicensed band, or both, includes an U-NII band.

DETAILED DESCRIPTION

Figure 1:
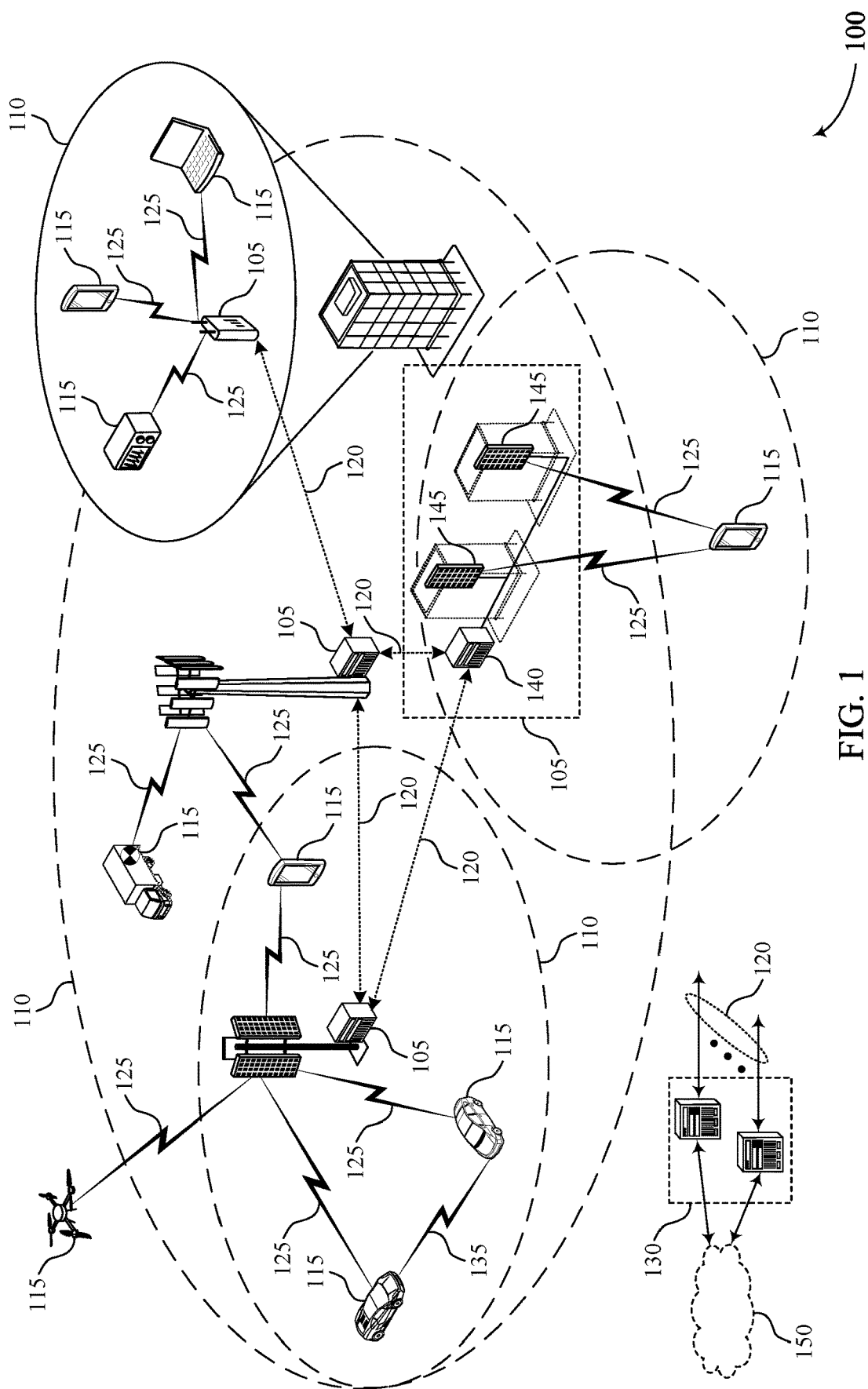
FIG. 1 illustrates an example of a wireless communications system that supports configurations for a carrier overlapping multiple unlicensed bands in accordance with aspects of the present disclosure.

In some wireless communications systems which support unlicensed spectrum bands (e.g., Unlicensed National Information Infrastructure (U-NII) bands), different unlicensed bands may exhibit different regulation requirements. Regulation requirements may be related to maximum transmission power levels among other parameters and may be defined by various regulating entities. Parameters associated with each set of regulation requirements may be indicated to a user equipment (UE) via a network signaling (NS) value indicated via a system information block (SIB). In some wireless communications systems (e.g., enhanced-License Assisted Access (eLAA)), unlicensed carriers may exhibit a pre-defined bandwidth (e.g., 20 MHz), and each unlicensed carrier may only be associated with a single set of regulation requirements. That is, each unlicensed carrier may be associated with only one NS value. However, in other wireless communications systems (e.g., NR-U), the bandwidth of unlicensed carriers may be much wider than pre-defined carrier bandwidths (e.g., wider than 20 MHz). In such cases, because the carrier may only be associated with a signal NS value, the unlicensed carrier may have to be divided up to enable more aggregated carriers (e.g., divided up into 20 MHz portions), or some spectrum of the unlicensed carrier may not be utilized by the UE. Accordingly, unlicensed carriers which span multiple unlicensed bands may result in underutilization of communication resources.

To address issues associated with unlicensed spectrum, techniques for resource allocation of unlicensed carriers which span multiple unlicensed bands are described. A UE may receive a resource allocation for an unlicensed carrier (e.g., NR-U carrier) which spans a first unlicensed band (e.g., first U-NII band) and a second unlicensed band (e.g., second U-NII band). The first and second unlicensed bands may be associated with different sets of requirements (e.g., maximum power requirements, regulatory requirements). The UE may additionally receive one or more sets of regulation requirement parameters (e.g., NS values) corresponding to the unlicensed carrier. The UE may receive a single NS value which indicates parameters which correspond to the most stringent requirements across the first unlicensed band and the second unlicensed band. Additionally or alternatively, the UE may receive multiple NS values associated with multiple resource subsets of the unlicensed carrier. The multiple NS values may be associated with subbands of the unlicensed carrier and/or bandwidth parts (BWPs) of the unlicensed carrier. When performing an uplink transmission, the UE may apply a set of parameters associated with the respective unlicensed band if the respective resource subset (e.g., subband, BWP) is disposed completely within the first or second unlicensed band. Alternatively, in cases where the respective resource subset (e.g., subband, BWP) is disposed within both the first and second unlicensed bands, the UE may apply a set of the most stringent parameters between with the first subband and the second subband when performing an uplink transmission. The set of the most stringent parameters may include the parameters associated with the first or second subbands, or a hybrid of the most stringent parameters associated with the first and second subbands. By enabling a single unlicensed carrier to be associated with multiple NS values, techniques described herein may lead to improved communication resource utilization within unlicensed spectrum.

Aspects of the disclosure are initially described in the context of wireless communications systems. Aspects of the disclosure are additionally described in the context of an example resource allocations and example process flows. Aspects of the disclosure are further illustrated by and described with reference to apparatus diagrams, system diagrams, and flowcharts that relate to techniques for configuring a carrier overlapping multiple unlicensed bands.

FIG. 1 illustrates an example of a wireless communications system 100 that supports configurations for a carrier overlapping multiple unlicensed bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for resource allocation of unlicensed carriers which span multiple unlicensed bands. In particular, aspects of the wireless communications system 100 may allow a single unlicensed carrier which spans multiple unlicensed bands to be associated with one or multiple sets of regulation requirement parameters. In particular, a base station 105 may be configured to signal sets of regulation requirement parameters (e.g., NS values) to a UE 115 with varying granularity. In some aspects, the base station 105 may indicate one or more sets of regulation requirement parameters for each unlicensed band (e.g., on a per-unlicensed band basis), for each subband or BWP (e.g., on a per-BWP basis), or for each uplink transmission (e.g., on a per-uplink transmission basis).

For example, a UE 115 may receive, from a base station 105, a resource allocation for an unlicensed carrier (e.g., NR-U carrier) which spans a first unlicensed band (e.g., first U-NII band) and a second unlicensed band (e.g., second U-NII band). The first and second unlicensed bands may be associated with different sets of regulation requirements. Regulation requirements may include any number or type of regulation or standards requirements associated with wireless communications or unlicensed spectrum. The regulation requirement parameters may be defined by various regulating entities. In this regard, regulation requirements may include any regulation or standards requirements known in the art including, but not limited to, effective isotropically radiated power (EIRP) values, power spectral density (PSD) power values, maximum power reduction (MPR) values (e.g., additional MPR (A-MPR) values), UE emission values, or the like.

In some aspects, a base station 105 may signal, to the UE 115, a single set of regulation requirement parameters associated with the unlicensed carrier which spans the first and second unlicensed bands. For example, the base station 105 may determine a first set of regulation requirement parameters associated with the first unlicensed band, and a second set of regulation requirement parameters associated with a second unlicensed band. In this example, the base station 105 may determine a subset of regulation requirement parameters having a strictest requirement between the first and second sets of regulation requirement parameters, and may signal the subset of regulation requirement parameters to the UE 115. The UE 115 may then communicate with the base station 105 via the unlicensed carrier using the subset of regulation requirement parameters.

In additional or alternative aspects, a base station 105 may signal, to the UE 115, multiple sets of regulation requirement parameters associated with the unlicensed carrier which spans the first and second unlicensed bands. For instance, the base station 105 may indicate a first set of regulation requirement parameters for the first unlicensed band, and a second set of regulation requirement parameters for the second unlicensed band. By way of another example, the base station 105 may indicate a first set of regulation requirement parameters for a first configured BWP of the unlicensed carrier, and a second set of regulation requirement parameters for a second configured BWP of the unlicensed carrier. In these examples, the UE 115 may determine a subset of regulation requirement parameters from the first and second sets of regulation requirement parameters to use for an uplink transmission based on whether frequency resources for the uplink transmission overlap with the first and second unlicensed bands and/or the first and second configured BWPs.

For instance, if a set of frequency resources for an uplink transmission correspond to the first configured BWP which is entirely within the first unlicensed band, the UE 115 may perform the uplink transmission using the first set of regulation requirement parameters associated with the first unlicensed band (or the first configured BWP). Comparatively, if a set of frequency resources for an uplink transmission correspond to a configured BWP that overlaps with both the first unlicensed band and the second unlicensed band, the UE 115 may determine a subset of regulation requirement parameters having a strictest requirement between the first regulation requirement parameter set and the second regulation requirement parameter set as the set of regulation requirement parameters, and may perform the uplink transmission using the subset of regulation requirement parameters.

In additional or alternative aspects, a base station 105 may signal, to the UE 115, a set of regulation requirement parameters associated with each uplink transmission from the UE 115. In this regard, the base station 105 may indicate, to the UE 115, a set of regulation requirement parameters on a per-uplink transmission basis. For example, the base station 105 may transmit, to the UE 115, a resource allocation for an unlicensed carrier which spans at least a portion of a first unlicensed band and a second unlicensed band. The base station 105 may further transmit, to the UE 115, an uplink resource configuration including a set of frequency resources for an uplink transmission and a set of regulation requirement parameters for the uplink transmission. Subsequently, the UE 115 may transmit the uplink transmission using the set of regulation requirement parameters indicated in the uplink resource configuration.

Techniques described herein may enable a single unlicensed carrier which spans two or more unlicensed bands to be associated with one or more sets of regulation requirement parameters (e.g., NS values). In particular, techniques described herein may enable a UE 115 and/or a base station 105 of the wireless communications system 100 to determine sets of regulation requirement parameters to be used by a UE 115 for uplink transmissions over an unlicensed carrier such that the resources of the unlicensed carrier may be efficiently utilized without requiring further subdivision of the unlicensed carrier. In this regard, techniques described herein may facilitate effective and efficient utilization of time and frequency resources in the context of unlicensed carriers.

Figure 2:
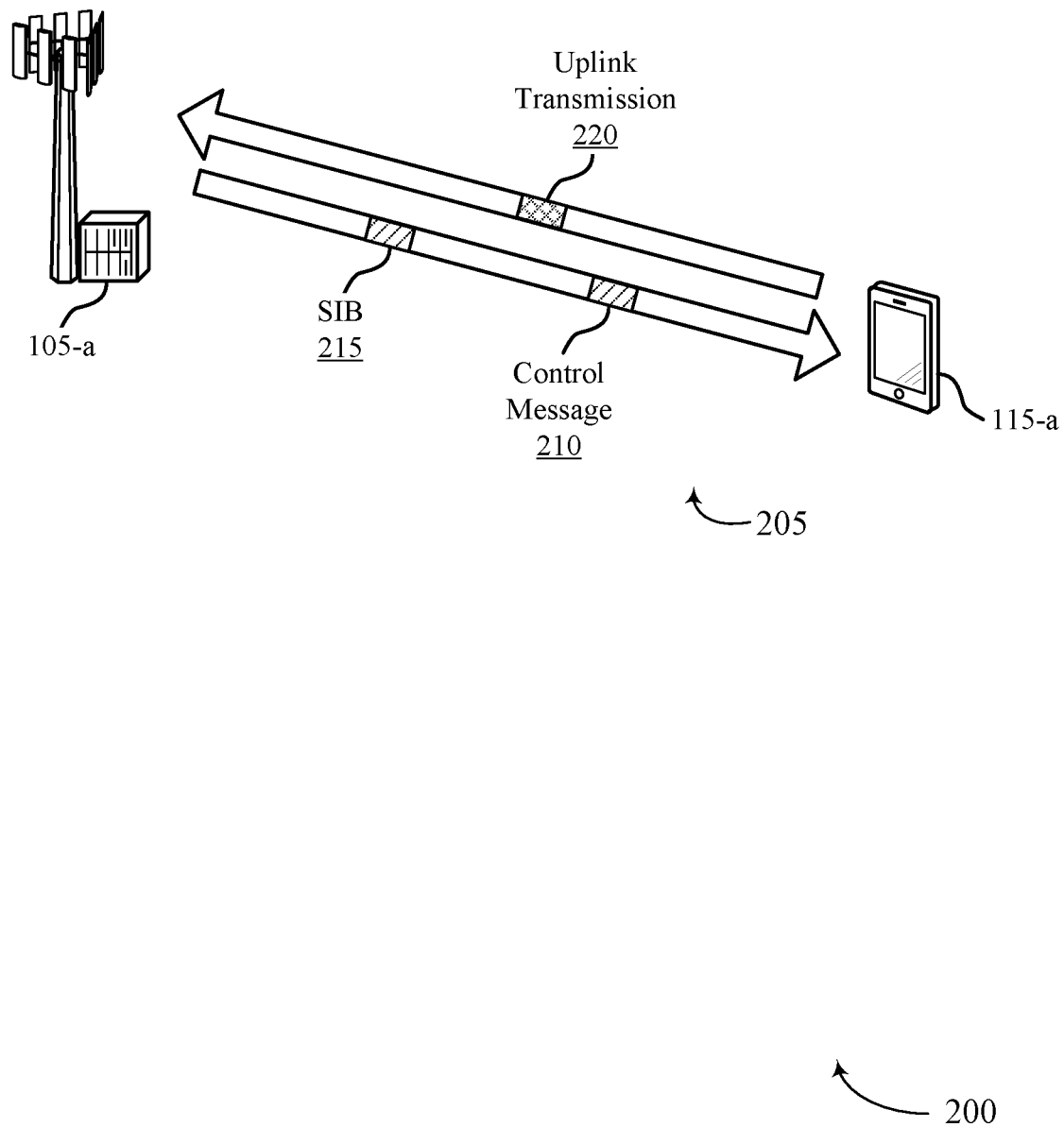
FIG. 2 illustrates an example of a wireless communications system that supports configurations for a carrier overlapping multiple unlicensed bands in accordance with aspects of the present disclosure.

FIG. 2 illustrates an example of a wireless communications system 200 that supports configurations for a carrier overlapping multiple unlicensed bands in accordance with aspects of the present disclosure. In some examples, wireless communications system 200 may implement aspects of wireless communications system 100. The wireless communications system 200 may include a base station 105-*a* and a UE 115-*a*, which may be examples of UEs 115 and base stations 105, as described with reference to FIG. 1.

The UE 115-*a* may communicate with the base station 105-*a* using a communication link 205. In some cases, the communication link 205 may include an example of an access link (e.g., a Uu link). In some cases, the communication link 205 may include an example of a unicast channel between the base station 105-*a* and the UE 115-*a*. The communication link 205 may include a bi-directional link that can include both uplink and downlink communication. In one aspect, the UE 115-*a* may transmit uplink transmissions, such as uplink messages or uplink signals, to the base station 105-*a* using the communication link 205 and the base station 105-*a* may transmit downlink transmissions, such as downlink messages or downlink signals, to the UE 115-*a* using the communication link 205.

The UE 115-*a* and the base station 105-*a* of the wireless communications system 200 may support techniques for resource allocation of unlicensed carriers which span multiple unlicensed bands. As noted previously herein, some wireless communications systems may allow a single unlicensed carrier to be associated with a single set of regulation requirement parameters (e.g., single NS value). However, this may lead to a waste of resources, or a need to sub-divide up unlicensed carriers, when the bandwidth of the unlicensed carrier is larger than that of respective unlicensed bands. Accordingly, techniques described herein may allow a single unlicensed carrier which spans multiple unlicensed bands or at least portions of multiple unlicensed bands to be associated with one or multiple sets of regulation requirement parameters (e.g., NS values). In particular, the base station 105-*a* may be configured to signal sets of regulation requirement parameters to the UE 115-*a* with varying granularity. In some aspects, the base station 105-*a* may indicate one or more sets of regulation requirement parameters for each unlicensed band (e.g., on a per-unlicensed band basis), for each subband or BWP (e.g., on a per-BWP basis), or for each uplink transmission (e.g., on a per-uplink transmission basis).

For example, the UE 115-*a* may receive, from the base station 105-*a*, a control message 210 or other downlink message indicating a resource allocation for an unlicensed carrier which spans a first unlicensed band and a second unlicensed band. As used herein, an unlicensed carrier or an unlicensed band may refer to use of radio frequency spectrum that is not licensed or otherwise not exclusively reserved for a particular entity (e.g., by the Federal Communications Commission (FCC)). Such unlicensed spectrum may also be referred to as shared spectrum. An unlicensed carrier may include any unlicensed carrier known in the art including, but not limited to, an unlicensed carrier configured for NR-U protocol. Similarly, the unlicensed bands may include any unlicensed band known in the art including, but not limited to, U-NII bands. In some aspects, the first and second unlicensed bands may be associated with different sets of regulation requirements. Regulation requirements may include any number or type of regulation or standards requirements associated with wireless communications or unlicensed spectrum. In this regard, regulation requirements may include any regulation or standards requirements known in the art including, but not limited to, EIRP values, PSD power values, MPR values (e.g., A-MPR values), UE emission values, or the like.

In some aspects, the UE 115-*a* may receive, from the base station 105-*a*, a SIB 215 indicating one or more sets of regulation requirement parameters (e.g., NS values) corresponding to the unlicensed carrier. The base station 105-*a* may be configured to signal sets of regulation requirement parameters to the UE 115-*a* via the SIB 215 with varying granularity. In some aspects, the base station 105-*a* may indicate one or more sets of regulation requirement parameters for each unlicensed band (e.g., on a per-unlicensed band basis), for each subband or BWP (e.g., on a per-BWP basis), or for each uplink transmission (e.g., on a per-uplink transmission basis). Although the example in FIG. 2 is described in the context of a SIB 215, the base station 105-*a* may indicate one or more sets of regulation requirement parameters for each unlicensed band using any form of downlink messaging or signaling.

In some aspects, a base station 105-*a* may signal, to the UE 115-*a* via the SIB 215, a single set of regulation requirement parameters associated with the unlicensed carrier which spans the first and second unlicensed bands. For example, the base station 105-*a* may determine a first set of regulation requirement parameters associated with the first unlicensed band, and a second set of regulation requirement parameters associated with a second unlicensed band. In this example, the base station 105-*a* may determine a subset of regulation requirement parameters having a strictest requirement between the first and second sets of regulation requirement parameters, and may signal the subset of regulation requirement parameters to the UE 115-*a*. The UE 115-*a* may then transmit an uplink transmission 220 to the base station 105 via the unlicensed carrier using the subset of regulation requirement parameters.

As described herein, the term "strictest requirement," and like terms, may refer to parameters which are the most limiting, or most conservative, between sets of similar parameters. For example, a first maximum transmission power limit which is lower than a second maximum transmission power limit may be more limiting, and therefore more "strict," in that it imposes more limits on the operation of the UE 115 as compared to the second maximum transmission power limit. In other words, a parameter which exhibits the "strictest requirement" between two a first parameter and a second parameter may include the parameter which will ensure compliance with both the first parameter and the second parameter.

By indicating a single set of regulation requirement parameters having a strictest requirement for the unlicensed carrier, the base station 105-*a* may ensure that communications at the UE 115-*a* over the unlicensed carrier comply with the regulation requirement parameters of both the first unlicensed band and the second unlicensed band. In some aspects, the set of regulation requirement parameters having the strictest requirement (e.g., most conservative requirement) may include the first regulation requirement parameter set or the second regulation requirement parameter set. Additionally or alternatively, the subset of regulation requirement parameters having the strictest requirement may include one or more parameters from the first regulation requirement parameter set and one or more parameters from the second regulation requirement parameter set. In this regard, the set of regulation requirement parameters having the strictest requirement may include a hybrid of the first and second regulation requirement parameter sets.

For example, the first regulation requirement parameter set may include a first PSD value and a first UE emission value, and the second regulation requirement parameter set may include a second PSD value and a second UE emission value. In this example, the base station 105-*a* may compare the first PSD value and the second PSD value, and may determine which PSD value has the strictest requirement for inclusion in the subset of regulation requirement parameters. For instance, the base station 105-*a* may determine the lowest PSD value between the first and second PSD values has the strictest requirement, and may thereby include the lower of the first and second PSD values in the subset of regulation requirement parameters. Similarly, the base station 105-*a* may compare the first UE emission value and the second UE emission value, and may determine which UE emission value has the strictest requirement for inclusion in the subset of regulation requirement parameters. For instance, the base station 105-*a* may determine the lowest UE emission value between the first and second UE emission values has the strictest requirement, and may thereby include the lower of the first and second UE emission values in the subset of regulation requirement parameters indicated to the UE 115-*a* via the SIB 215.

In additional or alternative aspects, the SIB 215 may include multiple sets of regulation requirement parameters associated with the unlicensed carrier which spans the first and second unlicensed bands (e.g., multiple NS values for the unlicensed carrier). For instance, the base station 105-*a* may indicate, via the SIB 215, a first set of regulation requirement parameters for the first unlicensed band, and a second set of regulation requirement parameters for the second unlicensed band. In this regard, the SIB 215 may indicate sets of regulation requirement parameters on a per-unlicensed band basis. By way of another example, the base station 105-*a* may indicate, via the SIB 215, a first set of regulation requirement parameters for a first configured BWP of the unlicensed carrier, and a second set of regulation requirement parameters for a second configured BWP of the unlicensed carrier. In this regard, the SIB 215 may indicate sets of regulation requirement parameters on a per-BWP basis.

In these examples, the UE 115-*a* may determine a subset of regulation requirement parameters from the first and second sets of regulation requirement parameters to use for an uplink transmission 220 based on whether frequency resources for the uplink transmission overlap with the first and second unlicensed bands and/or the first and second configured BWPs. For instance, if a set of frequency resources for an uplink transmission 220 correspond to the first configured BWP which is entirely within the first unlicensed band, the UE 115-*a* may perform the uplink transmission 220 using the first set of regulation requirement parameters associated with the first unlicensed band (or the first configured BWP). Comparatively, if a set of frequency resources for an uplink transmission 220 correspond to a configured BWP overlaps with both the first unlicensed band and the second unlicensed band, the UE 115-*a* may determine a subset of regulation requirement parameters having a strictest requirement between the first regulation requirement parameter set and the second regulation requirement parameter set as the set of regulation requirement parameters, and may transmit the uplink transmission 220 to the base station 105-*a* using the subset of regulation requirement parameters.

In additional or alternative aspects, a base station 105-a may signal, to the UE 115-a via the SIB 215, a set of regulation requirement parameters associated with each individual uplink transmission 220 from the UE 115-a. In this regard, the SIB 215 may indicate a set of regulation requirement parameters on a per-uplink transmission basis. For example, the base station 105-a may transmit, to the UE 115-a via the control message 210-a, a resource allocation for an unlicensed carrier which spans at least a portion of a first unlicensed band and a second unlicensed band. The base station 105-a may further transmit, via the control message 210 and/or SIB 215, an uplink resource configuration including a set of frequency resources for an uplink transmission 220 and a set of regulation requirement parameters for the uplink transmission 220. Subsequently, the UE 115-a may transmit the uplink transmission 220 to the base station 105-a using the set of regulation requirement parameters indicated in the uplink resource configuration.

Techniques described herein may enable a single unlicensed carrier which spans two or more unlicensed bands to be associated with one or more sets of regulation requirement parameters (e.g., NS values). In particular, techniques described herein may enable the UE 115-a and/or a base station 105-a of the wireless communications system 200 to determine sets of regulation requirement parameters to be used by a UE 115-a for uplink transmissions 220 over an unlicensed carrier such that the resources of the unlicensed carrier may be efficiently utilized without requiring further subdivision of the unlicensed carrier. In this regard, techniques described herein may facilitate effective and efficient utilization of time and frequency resources in the context of unlicensed carriers.

Figure 3B:
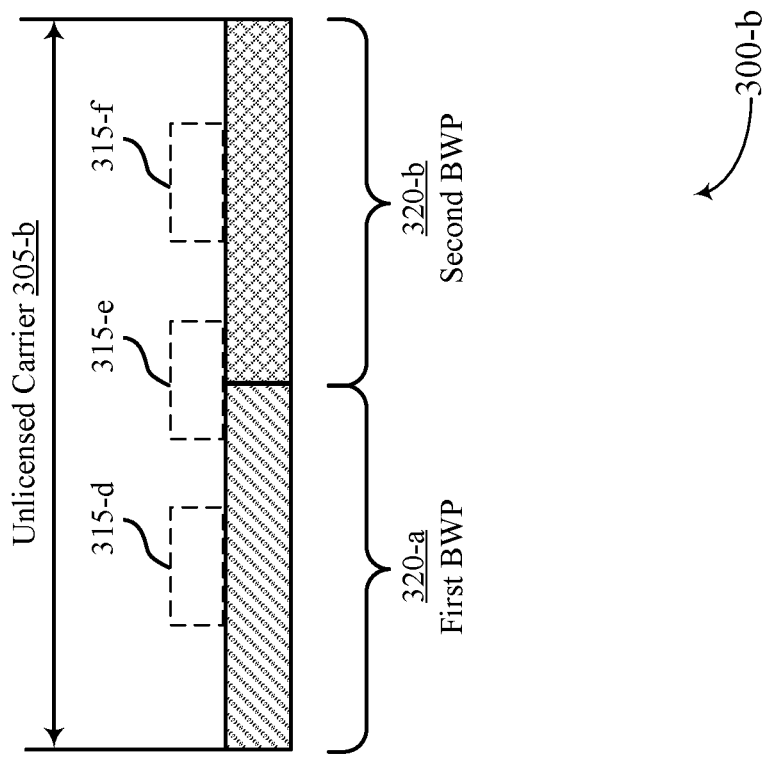
FIGS. 3A and 3B illustrate examples of resource allocations that support configurations for a carrier overlapping multiple unlicensed bands in accordance with aspects of the present disclosure.
Figure 3A:
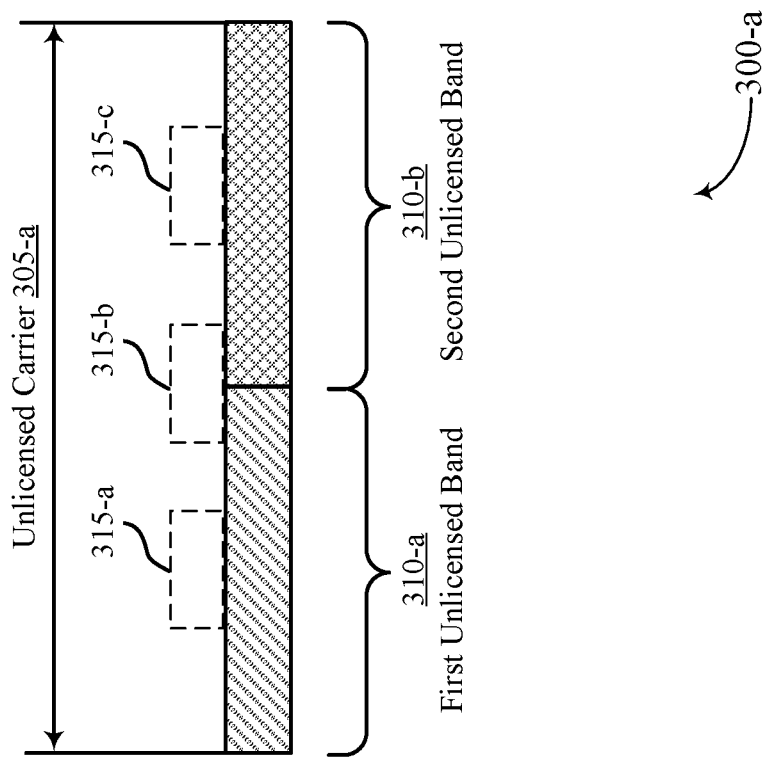

FIGS. 3A and 3B illustrates examples of resource allocations 300-a and 300-b that support configurations for a carrier overlapping multiple unlicensed bands in accordance with aspects of the present disclosure. In some examples, resource allocations 300-a and 300-b may implement aspects of wireless communications systems 100 or 200.

As noted previously herein, some wireless communications systems may allow a single unlicensed carrier to be associated with a single set of regulation requirement parameters (e.g., single NS value). However, this may lead to a waste of resources, or a need to sub-divide up unlicensed carriers, when the bandwidth of the unlicensed carrier is larger than that of respective unlicensed bands. Accordingly, techniques described herein may allow a single unlicensed carrier which spans multiple unlicensed bands to be associated with one or multiple sets of regulation requirement parameters. In particular, a base station 105 may be configured to signal sets of regulation requirement parameters to a UE 115 with varying granularity. In some aspects, the base station 105 may indicate one or more sets of regulation requirement parameters for each unlicensed band (e.g., on a per-unlicensed band basis), for each subband or BWP (e.g., on a per-BWP basis), or for each uplink transmission (e.g., on a per-uplink transmission basis).

Reference will now be made in particular to FIG. 3A. In some aspects, a UE 115 may receive, from a base station 105, a resource allocation for an unlicensed carrier 305-a (e.g., NR-U carrier) which spans a first unlicensed band 310-a (e.g., first U-NII band) and a second unlicensed band 310-a (e.g., second U-NII band). In some aspects, the first unlicensed band 310-a may be associated with a first set of regulation requirements, and the second unlicensed band 310-b may be associated with a second set of regulation requirements which may be different from the first set of regulation requirements.

In some cases, certain regulation requirement parameters associated with the first unlicensed band 310-a may be more strict (e.g., more conservative, more limiting) as compared to corresponding regulation requirement parameters associated with the second unlicensed band 310-b. Conversely, certain regulation requirement parameters associated with the second unlicensed band 310-b may be more strict (e.g., more conservative, more limiting) as compared to corresponding regulation requirement parameters associated with the first unlicensed band 310-a. In this regard, simply applying either the first set of regulation requirement parameters or the second set of regulation requirement parameters for the entirety of the unlicensed carrier 305-a may cause communications over the unlicensed carrier 305-a to be out of compliance with certain parameters of the first unlicensed band 310-a, the second unlicensed band 310-b, or both.

Accordingly, in some aspects, a base station 105 may determine a subset of regulation requirement parameters having a strictest requirement between the first set of regulation requirement parameters associated with the first unlicensed band 310-a and the second set of regulation requirement parameters associated with the second unlicensed band 310-b. In this regard, the base station 105 may compare the sets of regulation requirement parameters associated with the first unlicensed band 310-a and the second unlicensed band 310-b, and may determine a subset of regulation requirement parameters having a strictest requirement between the first and second sets of regulation requirement parameters. In this regard, the base station 105 may determine a subset of regulation requirement parameters having a strictest requirement which conform to all pertinent regulation requirement parameters of the first unlicensed band 310-a and the second unlicensed band 310-b. Subsequently, the base station 105 may indicate the subset of regulation requirement parameters to the UE 115 (e.g., via a downlink message such as SIB). The UE 115 may then communicate with the base station 105 over the unlicensed carrier 305-a using the subset of regulation requirement parameters. For example, as shown in FIG. 2, the UE 115-a may transmit an uplink transmission 315 to the base station 105-a via the unlicensed carrier 305-a using the subset of regulation requirement parameters having the strictest requirement.

By indicating a single subset of regulation requirement parameters having a strictest requirement for the unlicensed carrier 305-a, the base station 105 may ensure that communications at the UE 115 over the unlicensed carrier 305-a comply with the regulation requirement parameters of both the first unlicensed band 310-a and the second unlicensed band 310-b.

In additional or alternative aspects, the UE 115 may receive (e.g., via SIB) multiple sets of regulation requirement parameters associated with the unlicensed carrier 305-a which spans the first unlicensed band 310-a and the second unlicensed band 310-b (e.g., multiple NS values for the unlicensed carrier 305-a). For example, the UE 115 may receive a first set of regulation requirement parameters for the first unlicensed band 310-a, and a second set of regulation requirement parameters for the second unlicensed band 310-b. In this regard, UE 115 may receive sets of regulation requirement parameters on a per-unlicensed band basis.

In this example, the UE 115 may determine a subset of regulation requirement parameters from the first and second sets of regulation requirement parameters to use for an uplink transmission 315 based on whether frequency resources for the uplink transmission 315 overlap with the first unlicensed band 310-a and the second unlicensed band 310-a. For instance, if a set of frequency resources for an uplink transmission 315-*a* is entirely within the first unlicensed band 310-*a*, the UE 115 may perform the uplink transmission 315-*a* using the first set of regulation requirement parameters associated with the first unlicensed band 310-*a*. Similarly, if a set of frequency resources for an uplink transmission 315-*c* is entirely within the second unlicensed band 310-*b*, the UE 115 may perform the uplink transmission 315-*c* using the second set of regulation requirement parameters associated with the second unlicensed band 310-*b*.

Comparatively, if a set of frequency resources for an uplink transmission 315-*b* overlaps with both the first unlicensed band 310-*a* and the second unlicensed band 310-*b*, the UE 115 may determine a subset of regulation requirement parameters having a strictest requirement between the first regulation requirement parameter set and the second regulation requirement parameter set. For instance, the UE 115 may compare the first regulation requirement parameter set associated with the first unlicensed band 310-*a* and the second regulation requirement parameter set associated with second unlicensed band 310-*b*, and may determine a subset of regulation requirement parameters having a strictest requirement to use for the uplink transmission 315-*b*. Subsequently, the UE 115 may transmit the uplink transmission 315-*b* to the base station 105 using the subset of regulation requirement parameters having the strictest requirement.

In some aspects, the subset of regulation requirement parameters having the strictest requirement (e.g., most conservative requirement) may include the first regulation requirement parameter set associated with the first unlicensed band 310-*a* or the second regulation requirement parameter set associated with the second unlicensed band 310-*b*. Additionally or alternatively, the subset of regulation requirement parameters having the strictest requirement may include one or more parameters from the first regulation requirement parameter set and one or more parameters from the second regulation requirement parameter set. In this regard, the subset of regulation requirement parameters having the strictest requirement may include a hybrid of the first and second regulation requirement parameter sets.

For example, the first regulation requirement parameter set may include a first PSD value and a first UE emission value, and the second regulation requirement parameter set may include a second PSD value and a second UE emission value. In this example, the UE 115 may compare the first PSD value and the second PSD value, and may determine which PSD value has the strictest requirement for inclusion in the subset of regulation requirement parameters. For instance, the UE 115 may determine the lowest PSD value between the first and second PSD values has the strictest requirement, and may thereby include the lower of the first and second PSD values in the subset of regulation requirement parameters. Similarly, the UE 115 may compare the first UE emission value and the second UE emission value, and may determine which UE emission value has the strictest requirement for inclusion in the subset of regulation requirement parameters. For instance, the UE 115 may determine the lowest UE emission value between the first and second UE emission values has the strictest requirement, and may thereby include the lower of the first and second UE emission values in the subset of regulation requirement parameters. Subsequently, the UE 115 may transmit the uplink transmission 315-*b* using the subset of regulation requirement parameters having the strictest requirement.

In additional or alternative aspects, the UE 115 may receive (e.g., via SIB) multiple sets of regulation requirement parameters for an unlicensed carrier 305-*b* spanning multiple unlicensed bands on a per-BWP basis. For example, referring to FIG. 3B, the UE 115 may receive a first set of regulation requirement parameters (e.g., first NS value) for a first configured BWP 320-*a* of an unlicensed carrier 305-*b*, and a second set of regulation requirement parameters (e.g., second NS value) for a second configured BWP 320-*a* of the unlicensed carrier 305-*b*.

In this example, the UE 115 may determine a set of regulation requirement parameters from the first and second sets of regulation requirement parameters to use for an uplink transmission 315 based on whether frequency resources for the uplink transmission 315 overlap with the first configured BWP 320-*a* and the second configured BWP 320-*b*. For instance, if a set of frequency resources for an uplink transmission 315-*d* is entirely within the first configured BWP 320-*a*, the UE 115 may perform the uplink transmission 315-*d* using the first set of regulation requirement parameters associated with the first configured BWP 320-*a*. Similarly, if a set of frequency resources for an uplink transmission 315-*f* is entirely within the second configured BWP 320-*b*, the UE 115 may perform the uplink transmission 315-*f* using the second set of regulation requirement parameters associated with the second configured BWP 320-*b*.

Moreover, in cases where the UE 115 determines that the set of frequency resources for an uplink transmission 315 corresponds to a configured BWP 320 (e.g., first configured BWP 320-*a*, second configured BWP 320-*b*) which is entirely within an unlicensed band (e.g., entirely within the first unlicensed band 310-*a* or the second unlicensed band 310-*b*), the UE 115 may perform the uplink transmissions using the set of regulation requirement parameters associated with the respective configured BWP 320 and/or unlicensed band 310 based on the configured BWP 320 being entirely within the first or second unlicensed band 310.

Comparatively, if a set of frequency resources for an uplink transmission 315-*e* overlaps with both the first configured BWP 320-*a* and the second configured BWP 320-*b*, the UE 115 may determine a subset of regulation requirement parameters having a strictest requirement between the first regulation requirement parameter set associated with the first configured BWP 320-*a* and the second regulation requirement parameter set associated with the second configured BWP 320-*b*. For instance, the UE 115 may compare the regulation requirement parameters associated with the first configured BWP 320-*a* and the second configured BWP 320-*b*, and may determine a subset of regulation requirement parameters having a strictest requirement to use for the uplink transmission 315-*e*. Subsequently, the UE 115 may transmit the uplink transmission 315-*e* to the base station 105 using the subset of regulation requirement parameters having the strictest requirement.

Moreover, in cases where the UE 115 determines that the set of frequency resources for an uplink transmission 315 corresponds to a configured BWP 320 (e.g., first configured BWP 320-*a*, second configured BWP 320-*b*) which is overlaps multiple unlicensed bands (e.g., overlaps the first unlicensed band 310-*a* and the second unlicensed band 310-*b*), the UE 115 may perform the uplink transmission 315 using a subset of regulation requirement parameters having a strictest requirement between sets of regulation requirement parameters associated with the first unlicensed band 310-*a* and the second unlicensed band 310-*b* based on the configured BWP 320 being overlapping with the first unlicensed band 310-*a* and the second unlicensed band 310-*b*.

In additional or alternative aspects, the UE 115 may receive (e.g., via SIB) sets of regulation requirement parameters for each individual uplink transmission 315. In this regard, the UE 115 may receive sets of regulation requirement parameters on a per-uplink transmission basis. For example, referring again to FIG. 3A, the UE 115 may receive a resource allocation for the unlicensed carrier 305-*a* which spans at least a portion of the first unlicensed band 310-*a* and at least a portion of the second unlicensed band 310-*b*. The UE 115 may further receive an uplink resource configuration including a set of frequency resources for an uplink transmission 315-*a* and a set of regulation requirement parameters for the uplink transmission 315-*a*. Subsequently, the UE 115-*a* may transmit the uplink transmission 315-*a* to the base station 105-*a* using the set of regulation requirement parameters indicated in the uplink resource configuration. Similarly, the UE 115 may further receive an uplink resource configuration including a set of frequency resources for an uplink transmission 315-*b* and a set of regulation requirement parameters for the uplink transmission 315-*b*. Subsequently, the UE 115 may transmit the uplink transmission 315-*b* to the base station 105 using the set of regulation requirement parameters indicated in the uplink resource configuration.

Techniques described herein may enable an unlicensed carrier 305 which spans two or more unlicensed bands 310 to be associated with one or more sets of regulation requirement parameters (e.g., NS values). In particular, techniques described herein may enable a UE 115 and/or a base station 105 to determine sets of regulation requirement parameters to be used by a UE 115 for uplink transmissions 315 over an unlicensed carrier 305 such that the resources of the unlicensed carrier 305 may be efficiently utilized. In this regard, techniques described herein may facilitate effective and efficient utilization of time and frequency resources in the context of unlicensed carriers.

Figure 4:
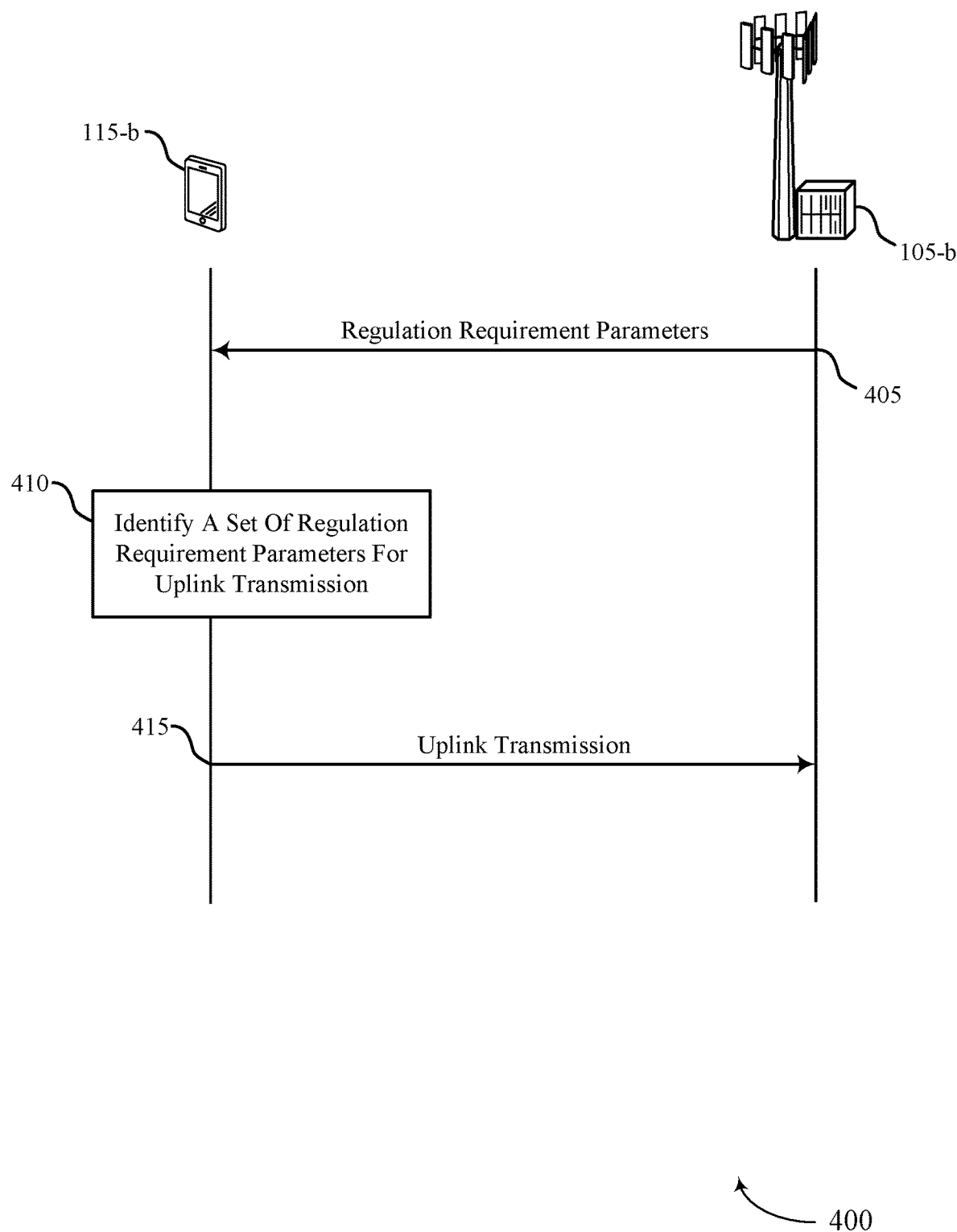
FIG. 4 illustrates an example of a process flow that supports configurations for a carrier overlapping multiple unlicensed bands in accordance with aspects of the present disclosure.

FIG. 4 illustrates an example of a process flow 400 that supports configurations for a carrier overlapping multiple unlicensed bands in accordance with aspects of the present disclosure. In some examples, process flow 400 may implement, or be implemented by, aspects of wireless communications systems 100 or 200, or resource allocations 300-*a* or 300-*b*. The process flow 400 may illustrate receiving regulation requirement parameters corresponding to an unlicensed carrier, identifying a set of regulation requirement parameters for an uplink transmission, and transmitting an uplink transmission, as described with reference to FIGS. 1-3B, among other aspects.

In some aspects, process flow 400 may include a UE 115-*b* and a base station 105-*b* which may be examples of corresponding devices as described herein. The UE 115-*b* illustrated in FIG. 4 may be an example of the UE 115-*a* illustrated in FIG. 2. Similarly, the base station 105-*b* illustrated in FIG. 4 may be an example of the base station 105-*a* illustrated in FIG. 2.

In some aspects, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*b* may receive one or more sets of regulation requirement parameters corresponding to an unlicensed carrier from the base station 105-*b*. In some aspects, the unlicensed carrier may span (e.g., straddle) at least a portion of a first unlicensed band (e.g., first U-NII band) associated with a first set of regulation requirements, and at least a portion of a second unlicensed band (e.g., second U-NII band) associated with a second set of regulation requirements. The regulation requirements associated with the respective sets of regulation requirement parameters may include any regulation or standards requirements known in the art including, but not limited to, an EIRP value, a PSD power value, an MPR value (e.g., A-MPR value), a UE emission value, or the like.

In some aspects, base station 105-*b* may transmit an SIB to the UE 115-*b*, where the SIB includes an indication of one or more sets of regulation requirement parameters. For example, in some cases, the SIB (or other downlink message) indicated by the base station 105 may indicate a first regulation requirement parameter set associated with the first unlicensed band, and a second regulation requirement set associated with the second unlicensed band. In this example, the base station 105 may indicate sets of regulation requirement sets on a per-unlicensed band basis. By way of another example, in other cases, the base station 105 may indicate a first regulation requirement parameter set associated with a first configured BWP of the unlicensed carrier, and a second regulation requirement set associated with a second configured BWP of the unlicensed carrier. In this example, the base station 105 may indicate sets of regulation requirement sets on a per-BWP basis.

At 410, the UE 115-*b* may identify a set (or subset) of regulation requirement parameters for an uplink transmission. In some aspects, the UE 115-*b* may determine the set of regulation requirement parameters for the uplink transmission based on the one or more sets of regulation requirement parameters indicated at 405. In additional aspects, the UE 115-*b* may determine the set of regulation requirement parameters for the uplink transmission based on whether a set of frequency resources for the uplink transmission overlaps with the first unlicensed band and the second unlicensed band.

For example, in cases where the first regulation requirement parameter set is associated with the first unlicensed band and the second regulation requirement parameter set is associated with the second unlicensed band, the UE 115-*b* may determine that a set of frequency resources of an uplink transmission is entirely within (or corresponds to a configured BWP that is entirely within) the first unlicensed band or the second unlicensed band. In this example, the UE 115-*b* may select the first regulation requirement parameter set or the second regulation requirement parameter set as the set of regulation requirement parameters for the uplink transmission based on the set of resources being entirely within the first unlicensed band or entirely within the second unlicensed band (or based on the set of resources corresponding to a configured BWP which is entirely within the first unlicensed band or the second unlicensed band). For instance, the UE 115-*b* may select the first regulation requirement parameter set if the set of frequency of the uplink transmission resources is entirely within (or corresponds to a configured BWP that is entirely within) the first unlicensed band. Similarly, the UE 115-*b* may select the second regulation requirement parameter set if the set of frequency of the uplink transmission resources is entirely within (or corresponds to a configured BWP that is entirely within) the second unlicensed band.

Comparatively, the UE 115-*b* may determine that the set of frequency resources for the uplink transmission overlaps with the first unlicensed band and the second unlicensed band (or corresponds to a configured BWP that overlaps with the first unlicensed band and the second unlicensed band). In this example, the UE 115-b may select, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission. The UE 115-b may select the subset of regulation requirement parameters having the strictest requirement based on the set of frequency resources of the uplink transmission overlapping with the first unlicensed band and the second unlicensed band (or based on the set of frequency resources corresponding to a configured BWP that overlaps with the first unlicensed band and the second unlicensed band).

In some aspects, the subset of regulation requirement parameters having the strictest requirement (e.g., most conservative requirement) may include the first regulation requirement parameter set or the second regulation requirement parameter set. Additionally or alternatively, the subset of regulation requirement parameters having the strictest requirement may include one or more parameters from the first regulation requirement parameter set and one or more parameters from the second regulation requirement parameter set. In this regard, the subset of regulation requirement parameters having the strictest requirement may include a hybrid of the first and second regulation requirement parameter sets.

For example, the first regulation requirement parameter set may include a first PSD value and a first UE emission value, and the second regulation requirement parameter set may include a second PSD value and a second UE emission value. In this example, the UE 115-b may compare the first PSD value and the second PSD value, and may determine which PSD value has the strictest requirement for inclusion in the subset of regulation requirement parameters. For instance, the UE 115-b may determine the lowest PSD value between the first and second PSD values has the strictest requirement, and may thereby include the lower of the first and second PSD values in the subset of regulation requirement parameters. Similarly, the UE 115-b may compare the first UE emission value and the second UE emission value, and may determine which UE emission value has the strictest requirement for inclusion in the subset of regulation requirement parameters. For instance, the UE 115-b may determine the lowest UE emission value between the first and second UE emission values has the strictest requirement, and may thereby include the lower of the first and second UE emission values in the subset of regulation requirement parameters.

At 415, the UE 115-b may transmit an uplink transmission to the base station 105-b. In some aspects, the UE 115-b may transmit the uplink transmission to the base station 105-a at 415 based on receiving the one or more sets of regulation requirement parameters at 405, determining the set (or subset) of regulation requirement parameters at 410, or both.

Techniques described herein may enable a single unlicensed carrier which spans a first unlicensed band and a second unlicensed band to be associated with a first set of regulation requirement parameters (e.g., first NS value) and a second set of regulation requirement parameters (e.g., second NS value). In particular, the UE 115-b may be able to determine whether to use the first or second sets of regulation requirement parameters, or a hybrid of the two (e.g., a subset of regulation requirement parameters having a strictest requirement) for an uplink transmission based whether a set of frequency resources associated with the uplink transmission overlaps the first and second unlicensed bands. In this regard, techniques described herein may facilitate effective and efficient utilization of time and frequency resources in the context of unlicensed carriers.

Figure 5:
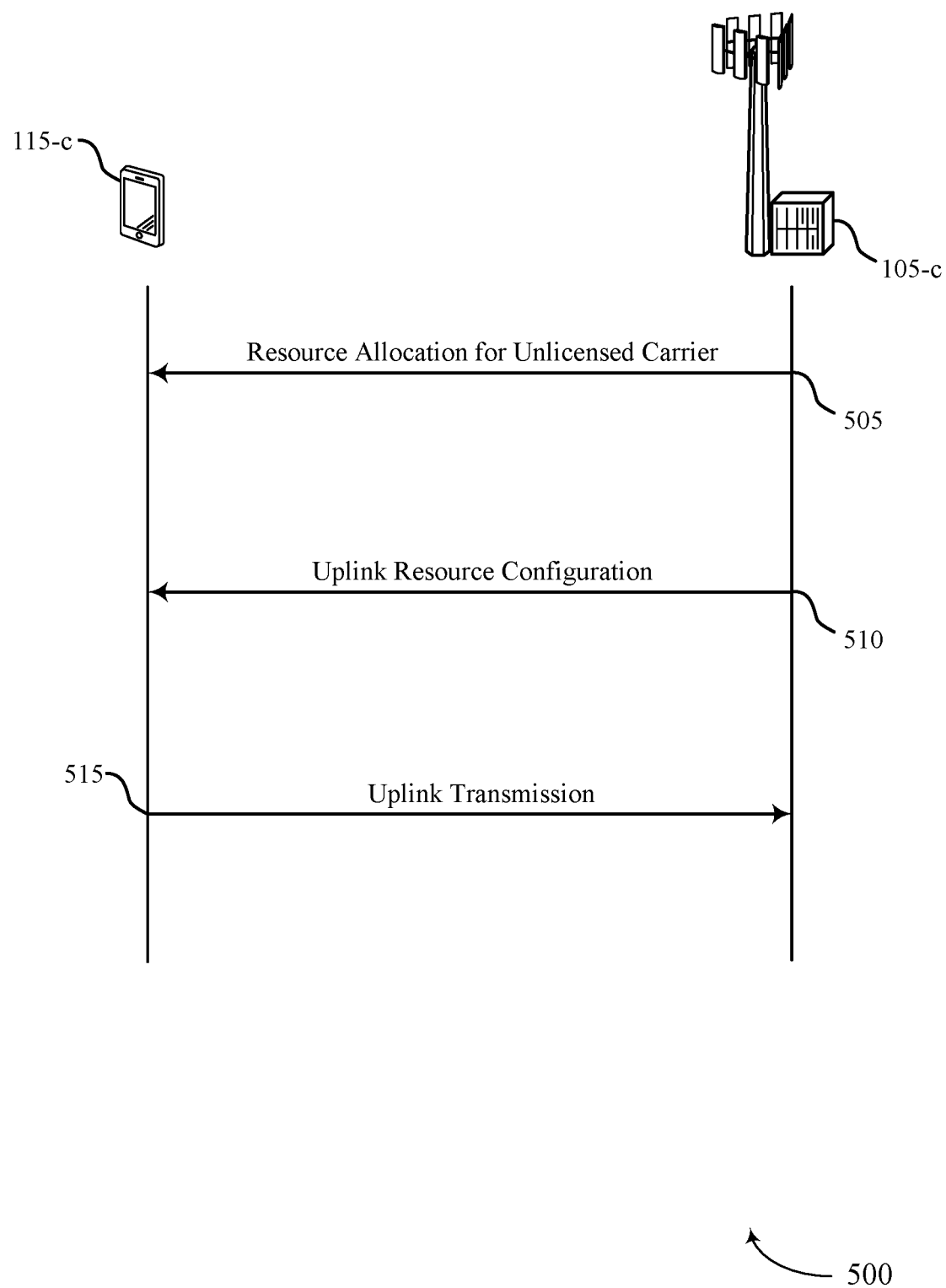
FIG. 5 illustrates an example of a process flow that supports configurations for a carrier overlapping multiple unlicensed bands in accordance with aspects of the present disclosure.

FIG. 5 illustrates an example of a process flow 500 that supports configurations for a carrier overlapping multiple unlicensed bands in accordance with aspects of the present disclosure. In some examples, process flow 500 may implement, or be implemented by, aspects of wireless communications systems 100 or 200, or resource allocations 300-a or 300-b. The process flow 500 may illustrate receiving a resource allocation for an unlicensed carrier, receiving an uplink resource configuration indicating a set of regulation requirement parameters for an uplink transmission, and transmitting an uplink transmission, as described with reference to FIGS. 1-3B, among other aspects.

In some aspects, process flow 500 may include a UE 115-c and a base station 105-c which may be examples of corresponding devices as described herein. The UE 115-c illustrated in FIG. 5 may be an example of the UE 115-a illustrated in FIG. 2. Similarly, the base station 105-c illustrated in FIG. 5 may be an example of the base station 105-a illustrated in FIG. 2.

In some aspects, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the base station 105-c may transmit a resource allocation for an unlicensed carrier to the UE 115-b. In some aspects, the unlicensed carrier may span (e.g., straddle) at least a portion of a first unlicensed band (e.g., first U-NII band) associated with a first set of regulation requirements, and at least a portion of a second unlicensed band (e.g., second U-NII band) associated with a second set of regulation requirements. In some aspects, resource allocation transmitted at 505 may be indicated in a control message, a configuration message, or other downlink transmission from the base station 105-c. The regulation requirements associated with the respective sets of regulation requirement parameters may include any regulation or standards requirements known in the art including, but not limited to, an EIRP value, a PSD power value, an MPR value (e.g., A-MPR value), a UE emission value, or the like.

At 510, the base station 105-c may transmit an uplink resource configuration to the UE 115-c. In some aspects, uplink resource configuration may indicate a set of frequency resources for an uplink transmission. In additional or alternative aspects, the uplink resource configuration may indicate a set of regulation requirement parameters (e.g., an NS value) for the uplink transmission. In this regard, the base station 105-c may indicate the set of regulation requirement parameters to the UE 115-c via the uplink resource configuration on a per-uplink transmission basis.

The uplink transmission may include a dynamically configured physical uplink shared channel (PUSCH) transmission, a semi-statically configured PUSCH transmission, an uplink control message (e.g., physical uplink control channel (PUCCH) message, a physical random access channel (PRACH) message), a reference signal (e.g., SRS), or any combination thereof. Similarly, the uplink resource configuration message may include an uplink grant, a configured grant, a downlink control information (DCI) message (e.g., an activation DCI message), a resource configuration message, or any combination thereof. For example, in cases where the uplink transmission includes a dynamically configured PUSCH transmission, the uplink resource configuration may include an uplink grant. By way of another example, in cases where the uplink transmission includes a semi-statically configured PUSCH transmission, the uplink resource configuration may include a configured grant or an activation DCI message. By way of another example, in cases where the uplink transmission includes an uplink control message or a reference signal, the uplink resource configuration may include a resource configuration message for the uplink control message or the reference signal.

In some aspects, the base station 105-c may determine the set of regulation requirement parameters for the uplink transmission based on the set of frequency resources for the uplink transmission. For example, in cases where the set of frequency resources are entirely within the first unlicensed band, the base station 105-c may determine that the set of resource parameters for the uplink transmission include the set of regulation requirement parameters associated with the first unlicensed band. Similarly, in cases where the set of frequency resources are entirely within the second unlicensed band, the base station 105-c may determine that the set of resource parameters for the uplink transmission include the set of regulation requirement parameters associated with the second unlicensed band. By way of anther example, in cases where the set of frequency resources overlap with the first and second unlicensed bands, the base station 105-c may determine the set of resource parameters for the uplink transmission include a subset of regulation requirement parameters having a strictest requirement between the respective regulation requirement parameters associated with the first and second unlicensed bands.

At 515, the UE 115-c may transmit an uplink transmission to the base station 105-c. In some aspects, the UE 115-c may transmit the uplink transmission to the base station 105-c at 515 based on receiving the resource allocation at 505, receiving the uplink resource configuration at 510, or both. For example, the UE 115-c may transmit the uplink transmission using the set of regulation requirement parameters indicated in the uplink resource configuration.

Techniques described herein may improve resource utilization associated with a single unlicensed carrier which spans a first unlicensed band and a second unlicensed band. In particular, by signaling a set of regulation requirement parameters to the UE 115-c for each respective uplink transmission (e.g., on a per-uplink transmission basis), the base station 105-d may ensure that each uplink transmission conforms to applicable regulation requirement parameters associated with the first and second unlicensed bands. In this regard, techniques described herein may facilitate effective and efficient utilization of time and frequency resources in the context of unlicensed carriers.

Figure 6:
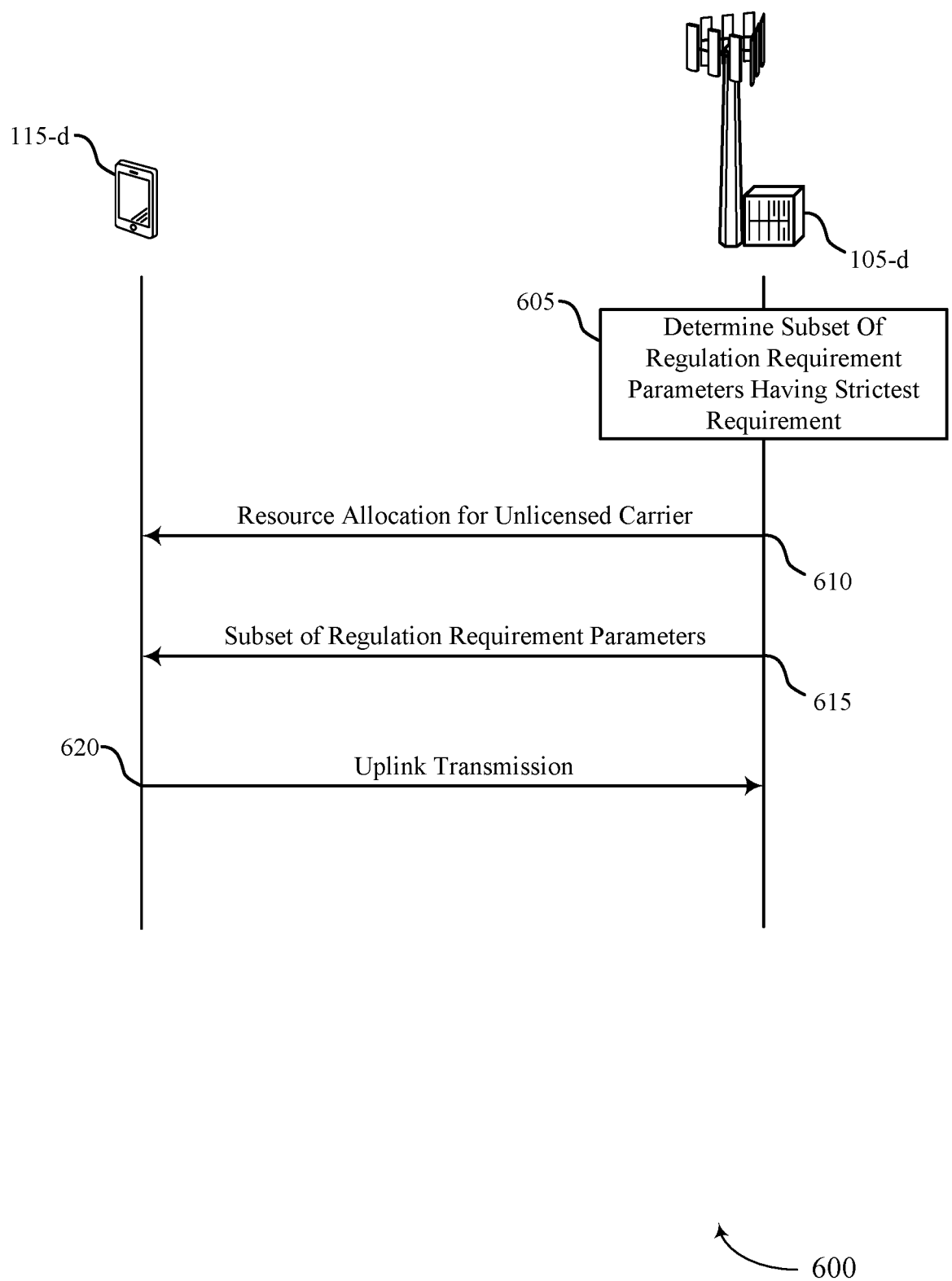
FIG. 6 illustrates an example of a process flow that supports configurations for a carrier overlapping multiple unlicensed bands in accordance with aspects of the present disclosure.

FIG. 6 illustrates an example of a process flow 600 that supports configurations for a carrier overlapping multiple unlicensed bands in accordance with aspects of the present disclosure. In some examples, process flow 600 may implement aspects of wireless communications systems 100 or 200, or resource allocations 300-a or 300-b. The process flow 600 may illustrate determining a subset of regulation requirement parameters having a strictest requirement, transmitting a resource allocation for an unlicensed carrier, transmitting the subset of regulation requirement parameters, and receiving an uplink transmission, as described with reference to FIGS. 1-3B, among other aspects.

In some aspects, process flow 600 may include a UE 115-d and a base station 105-d which may be examples of corresponding devices as described herein. The UE 115-d illustrated in FIG. 6 may be an example of the UE 115-a illustrated in FIG. 2. Similarly, the base station 105-d illustrated in FIG. 6 may be an example of the base station 105-a illustrated in FIG. 2.

In some aspects, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the base station 105-d may determine a subset of regulation requirement parameters having a strictest requirement between a first set of regulation requirement parameters associated with a first unlicensed band (e.g., first U-NII band) and a second set of regulation requirement parameters associated with a second unlicensed band (e.g., second U-NII band). For example, the base station 105-d may determine the first set of regulation requirement parameters associated with the first unlicensed band, and may determine the second set of regulation requirement parameters associated with the second unlicensed band. In this example, the base station 105-d may compare the first and second sets of regulation requirement parameters to determine the subset of regulation requirement parameters having a strictest requirement. The regulation requirements associated with the respective sets of regulation requirement parameters may include any regulation or standards requirements known in the art including, but not limited to, an EIRP value, a PSD power value, an MPR value (e.g., A-MPR value), a UE emission value, or the like.

At 610, the base station 105-d may transmit a resource allocation for an unlicensed carrier to the UE 115-d. In some aspects, the unlicensed carrier may span (e.g., straddle) at least a portion of the first unlicensed band associated and at least a portion of the second unlicensed band. In some aspects, resource allocation transmitted at 610 may be indicated in a control message, a configuration message, or other downlink transmission from the base station 105-c.

At 615, the base station 105-d may transmit an indication of the subset of regulation requirement parameters (e.g., an NS value) for uplink transmissions on the unlicensed carrier. In this regard, the base station 105-d may transmit a single subset of regulation requirement parameters (e.g., single NS value) for the unlicensed carrier (e.g., on a per-unlicensed carrier basis). In some aspects, the base station 105-d may transmit the indication of the subset of the regulation requirement parameters at 615 based on determining the subset of regulation requirement parameters at 605, transmitting the resource allocation at 610, or both.

At 620, the UE 115-d may transmit an uplink transmission to the base station 105-d. In some aspects, the UE 115-d may transmit the uplink transmission to the base station 105-d at 620 based on receiving the resource allocation at 610, receiving the indication of the subset of regulation requirement parameters at 615, or both.

Techniques described herein may improve resource utilization associated with a single unlicensed carrier which spans a first unlicensed band and a second unlicensed band. In particular, by signaling a single subset of regulation requirement parameters to the UE 115-c for uplink transmissions over an unlicensed carrier (e.g., on a per-unlicensed carrier basis), the base station 105-d may ensure that uplink transmissions performed via the unlicensed carrier conform to applicable regulation requirement parameters associated with the first and second unlicensed bands. In this regard, techniques described herein may facilitate effective and efficient utilization of time and frequency resources in the context of unlicensed carriers.

Figure 7:
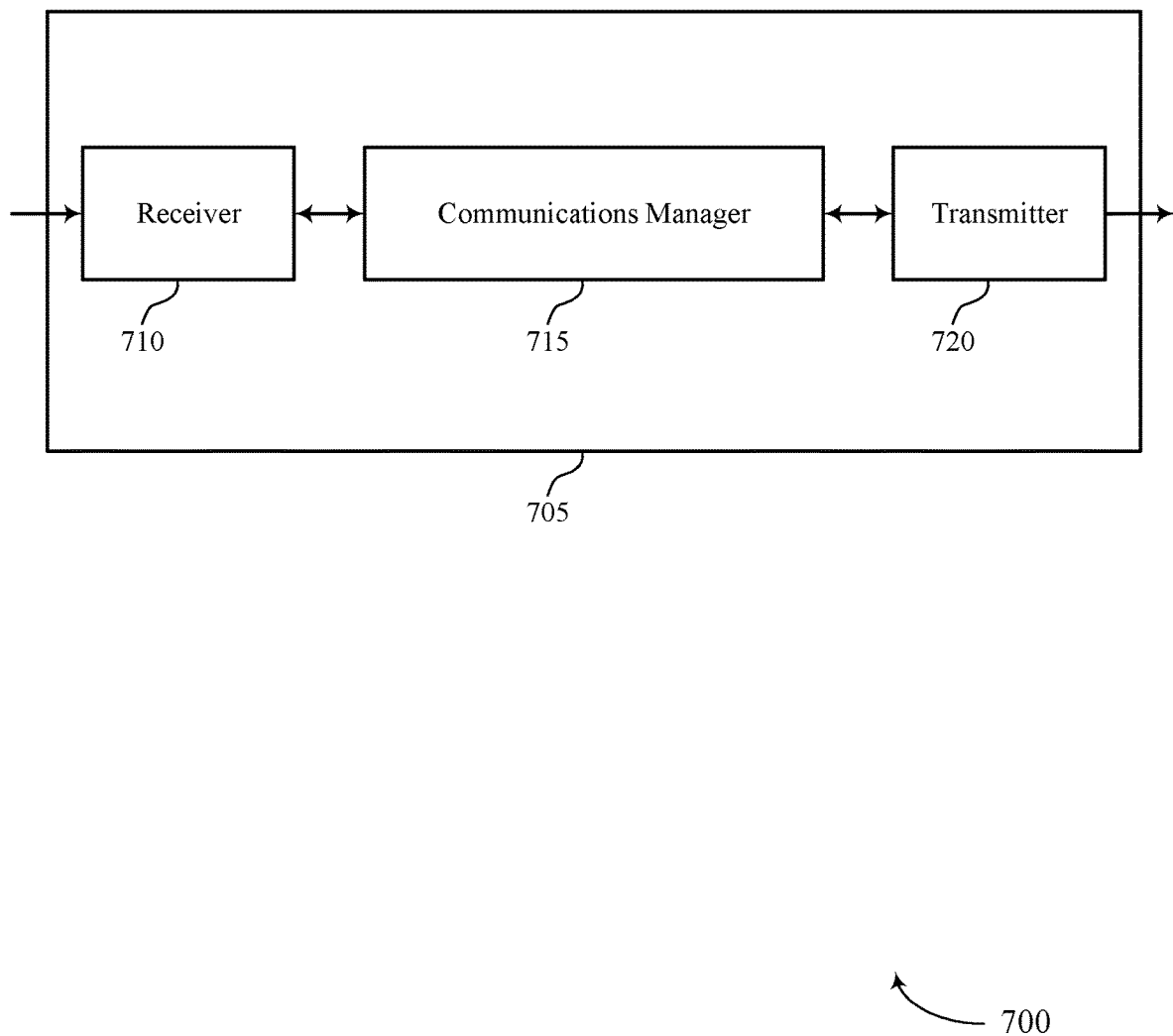
FIGS. 7 and 8 show block diagrams of devices that support configurations for a carrier overlapping multiple unlicensed bands in accordance with aspects of the present disclosure.

FIG. 7 shows a block diagram 700 of a device 705 that supports configurations for a carrier overlapping multiple unlicensed bands in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to configurations for a carrier overlapping multiple unlicensed bands, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements, identify, from the set of regulation requirement parameters, a set of regulation requirement parameters for an uplink transmission based on whether a set of frequency resources for the uplink transmission overlaps with the first unlicensed band and the second unlicensed band, and transmit the uplink transmission using the set of regulation requirement parameters. The communications manager 715 may also receive a resource allocation for an unlicensed carrier which spans at least a portion of a first unlicensed band associated with a first set of regulation requirements and at least a portion of a second unlicensed band associated with a second set of regulation requirements, receive an uplink resource configuration indicating a set of frequency resources for an uplink transmission and a set of regulation requirement parameters for the uplink transmission, and transmit the uplink transmission using the set of regulation requirement parameters. The communications manager 715 may be an example of aspects of the communications manager 1010 described herein.

The actions performed by the communications manager 715 as described herein may be implemented to realize one or more potential advantages. For example, enabling a single unlicensed carrier which spans multiple unlicensed bands to be associated with multiple sets of regulation requirement parameters may facilitate effective and efficient utilization of time and frequency resources in the context of unlicensed carriers. Accordingly, by improving resource utilization, the efficiency and reliability of wireless communications over unlicensed carriers may be reduced, and a quantity of UEs 115 which may be supported by unlicensed carriers may be increased.

By enabling a single unlicensed carrier which spans multiple unlicensed bands to be associated with multiple sets of regulation requirement parameters, a processor of the UE 115 (e.g., a processor controlling the receiver 710, the communications manager 715, the transmitter 720, etc.) may reduce processing resources used for uplink communications. For example, by enabling the UE 115 to utilize an entire bandwidth of an unlicensed carrier, larger quantities of data may be transmitted for each uplink transmission, correspondingly reducing a number of times the processor ramps up processing power and turns on processing units to handle uplink transmission.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
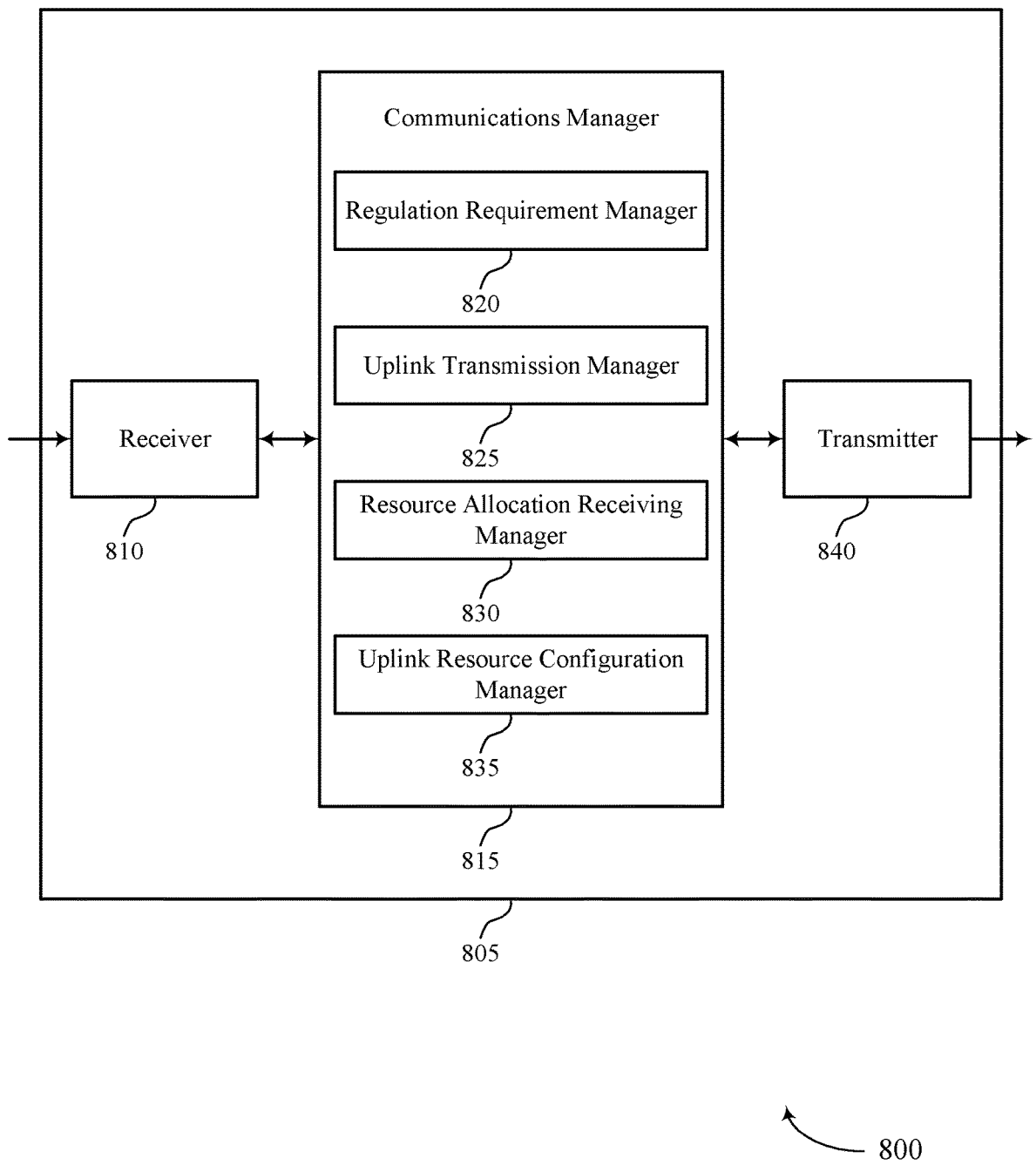

FIG. 8 shows a block diagram 800 of a device 805 that supports configurations for a carrier overlapping multiple unlicensed bands in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to configurations for a carrier overlapping multiple unlicensed bands, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a regulation requirement manager 820, an uplink transmission manager 825, a resource allocation receiving manager 830, and an uplink resource configuration manager 835. The communications manager 815 may be an example of aspects of the communications manager 1010 described herein.

The regulation requirement manager 820 may receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements and identify, from the set of regulation requirement parameters, a set of regulation requirement parameters for an uplink transmission based on whether a set of frequency resources for the uplink transmission overlaps with the first unlicensed band and the second unlicensed band.

The uplink transmission manager 825 may transmit the uplink transmission using the set of regulation requirement parameters.

The resource allocation receiving manager 830 may receive a resource allocation for an unlicensed carrier which spans at least a portion of a first unlicensed band associated with a first set of regulation requirements and at least a portion of a second unlicensed band associated with a second set of regulation requirements. The uplink resource configuration manager 835 may receive an uplink resource configuration indicating a set of frequency resources for an uplink transmission and a set of regulation requirement parameters for the uplink transmission. The uplink transmission manager 825 may transmit the uplink transmission using the set of regulation requirement parameters.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
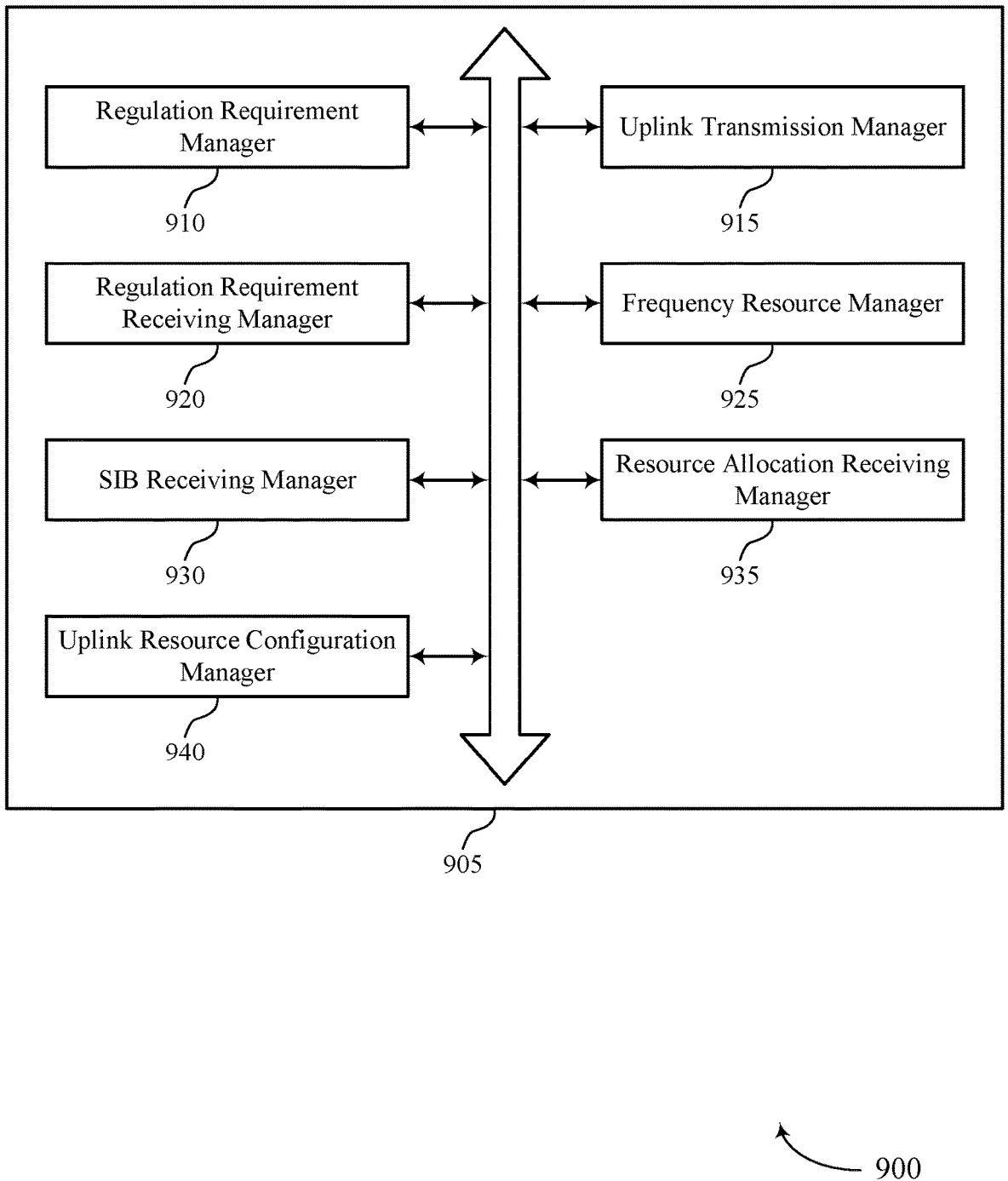
FIG. 9 shows a block diagram of a communications manager that supports configurations for a carrier overlapping multiple unlicensed bands in accordance with aspects of the present disclosure.

FIG. 9 shows a block diagram 900 of a communications manager 905 that supports configurations for a carrier overlapping multiple unlicensed bands in accordance with aspects of the present disclosure. The communications manager 905 may be an example of aspects of a communications manager 715, a communications manager 815, or a communications manager 1010 described herein. The communications manager 905 may include a regulation requirement manager 910, an uplink transmission manager 915, a regulation requirement receiving manager 920, a frequency resource manager 925, a SIB receiving manager 930, a resource allocation receiving manager 935, and an uplink resource configuration manager 940. Each of these modules may communicate, directly or indirectly, with one another (e.g., via one or more buses).

The regulation requirement manager 910 may receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements. In some examples, the regulation requirement manager 910 may identify, from the set of regulation requirement parameters, a set of regulation requirement parameters for an uplink transmission based on whether a set of frequency resources for the uplink transmission overlaps with the first unlicensed band and the second unlicensed band.

In some examples, the regulation requirement manager 910 may select the first regulation requirement parameter set or the second regulation requirement parameter set as the set of regulation requirement parameters for the uplink transmission based on the configured bandwidth part being entirely within the first unlicensed band or entirely within the second unlicensed band. In some examples, the regulation requirement manager 910 may select, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based on the configured bandwidth part overlapping with the first unlicensed band and the second unlicensed band.

In some examples, the regulation requirement manager 910 may select the first regulation requirement parameter set or the second regulation requirement parameter set as the set of regulation requirement parameters for the uplink transmission based on the set of frequency resources for the uplink transmission being entirely within the first unlicensed band or entirely within the second unlicensed band.

In some examples, the regulation requirement manager 910 may select, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based on the set of frequency resources for the uplink transmission overlapping with the first unlicensed band and the second unlicensed band.

In some examples, the regulation requirement manager 910 may select the first regulation requirement parameter set or the second regulation requirement parameter set as the set of regulation requirement parameters for the uplink transmission based on the set of frequency resources for the uplink transmission corresponding to the first configured bandwidth part or the second configured bandwidth part.

In some examples, the regulation requirement manager 910 may select, from the first set of regulation requirement parameter sets and the second set of regulation requirement parameter sets, a regulation requirement parameter set corresponding to the first unlicensed band or the second unlicensed band as the set of regulation requirement parameters for the uplink transmission based on the set of frequency resources for the uplink transmission being entirely within the first unlicensed band or entirely within the second unlicensed band.

In some examples, the regulation requirement manager 910 may select, from the first set of regulation requirement parameter sets and the second set of regulation requirement parameter sets, a subset of regulation requirement parameters having a strictest requirement between the first regulation requirement parameter set and the second regulation requirement parameter set as the set of regulation requirement parameters for the uplink transmission based on the set of frequency resources for the uplink transmission overlapping with the first unlicensed band and the second unlicensed band.

In some cases, the set of regulation requirement parameters includes an EIRP, a PSD power value, an MPR value, a UE emission value, or any combination thereof. In some cases, the first unlicensed band, the second unlicensed band, or both, includes a U-NII band.

The uplink transmission manager 915 may transmit the uplink transmission using the set of regulation requirement parameters. In some examples, the uplink transmission manager 915 may transmit the uplink transmission using the set of regulation requirement parameters. In some cases, the uplink transmission includes a dynamically configured physical uplink shared channel transmission, and where the uplink resource configuration includes an uplink grant. In some cases, the uplink transmission includes a semi-statically configured physical uplink shared channel transmission, and where the uplink resource configuration includes a configured grant or an activation downlink control information message. In some cases, the uplink transmission includes an uplink control message or a reference signal, and where the uplink resource configuration includes a resource configuration message for the uplink control message or the reference signal.

The resource allocation receiving manager 935 may receive a resource allocation for an unlicensed carrier which spans at least a portion of a first unlicensed band associated with a first set of regulation requirements and at least a portion of a second unlicensed band associated with a second set of regulation requirements.

The uplink resource configuration manager 940 may receive an uplink resource configuration indicating a set of frequency resources for an uplink transmission and a set of regulation requirement parameters for the uplink transmission.

The regulation requirement receiving manager 920 may receive a first regulation requirement parameter set associated with the first unlicensed band. In some examples, the regulation requirement receiving manager 920 may receive a second regulation requirement parameter set associated with the second unlicensed band. In some examples, the regulation requirement receiving manager 920 may receive a first regulation requirement parameter set associated with a first configured bandwidth part of the unlicensed carrier. In some examples, the regulation requirement receiving manager 920 may receive a second regulation requirement parameter set associated with a second configured bandwidth part of the unlicensed carrier.

The frequency resource manager 925 may determine that the set of frequency resources for the uplink transmission corresponds to a configured bandwidth part that is entirely within the first unlicensed band or entirely within the second unlicensed band. In some examples, the frequency resource manager 925 may determine that the set of frequency resources for the uplink transmission corresponds to a configured bandwidth part that overlaps with the first unlicensed band and the second unlicensed band. In some examples, the frequency resource manager 925 may determine that the set of frequency resources for the uplink transmission is entirely within the first unlicensed band or entirely within the second unlicensed band. In some examples, the frequency resource manager 925 may determine that the set of frequency resources for the uplink transmission overlaps with the first unlicensed band and the second unlicensed band. In some examples, the frequency resource manager 925 may determine that the set of frequency resources for the uplink transmission corresponds to the first configured bandwidth part or the second configured bandwidth part. In some examples, the frequency resource manager 925 may determine that the set of frequency resources for the uplink transmission overlaps with the first unlicensed band and the second unlicensed band.

The SIB receiving manager 930 may receive, from a base station, a SIB including an indication of the set of regulation requirement parameters.

Figure 10:
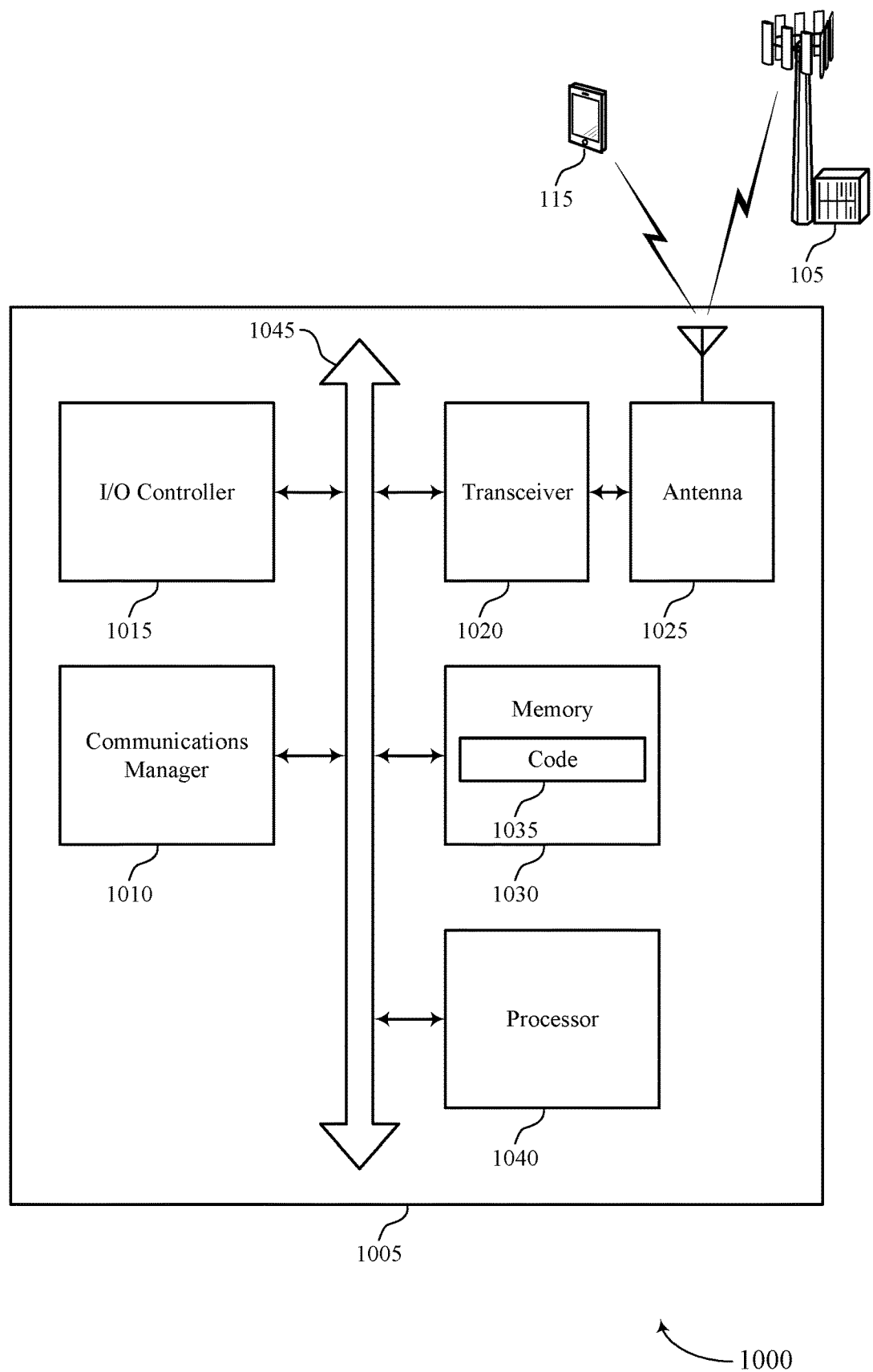
FIG. 10 shows a diagram of a system including a device that supports configurations for a carrier overlapping multiple unlicensed bands in accordance with aspects of the present disclosure.

FIG. 10 shows a diagram of a system 1000 including a device 1005 that supports configurations for a carrier overlapping multiple unlicensed bands in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements, identify, from the set of regulation requirement parameters, a set of regulation requirement parameters for an uplink transmission based on whether a set of frequency resources for the uplink transmission overlaps with the first unlicensed band and the second unlicensed band, and transmit the uplink transmission using the set of regulation requirement parameters. The communications manager 1010 may also receive a resource allocation for an unlicensed carrier which spans at least a portion of a first unlicensed band associated with a first set of regulation requirements and at least a portion of a second unlicensed band associated with a second set of regulation requirements, receive an uplink resource configuration indicating a set of frequency resources for an uplink transmission and a set of regulation requirement parameters for the uplink transmission, and transmit the uplink transmission using the set of regulation requirement parameters.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configurations for a carrier overlapping multiple unlicensed bands).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
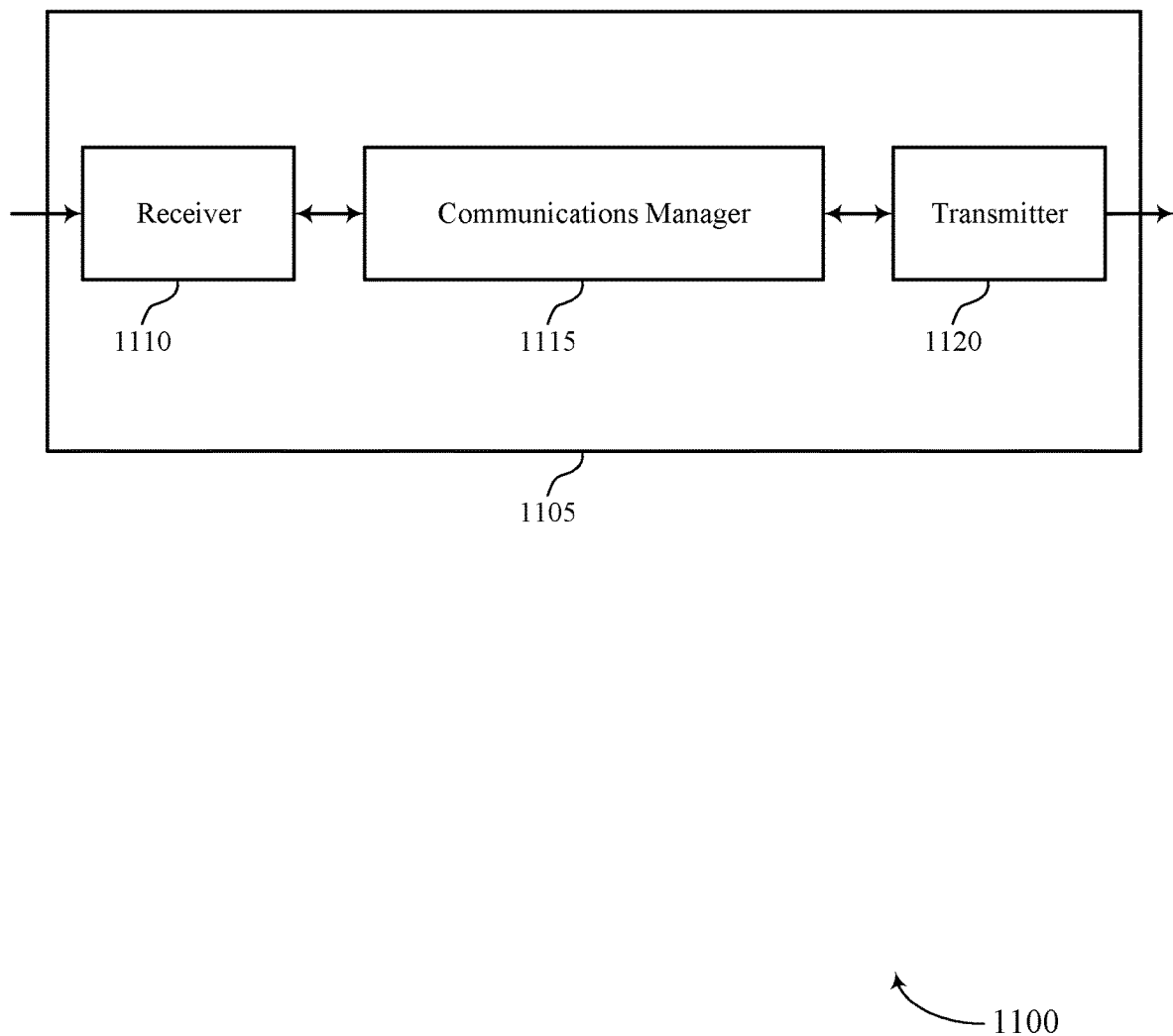
FIGS. 11 and 12 show block diagrams of devices that support configurations for a carrier overlapping multiple unlicensed bands in accordance with aspects of the present disclosure.

FIG. 11 shows a block diagram 1100 of a device 1105 that supports configurations for a carrier overlapping multiple unlicensed bands in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to configurations for a carrier overlapping multiple unlicensed bands, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a resource allocation for an unlicensed carrier which spans at least a portion of a first unlicensed band associated with a first set of regulation requirements and at least a portion of a second unlicensed band associated with a second set of regulation requirements, transmit, to the UE, an uplink resource configuration indicating a set of frequency resources for an uplink transmission and a set of regulation requirement parameters for the uplink transmission, and receive, from the UE, the uplink transmission using the set of regulation requirement parameters. The communications manager 1115 may also determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements, transmit, to a UE, a resource allocation for an unlicensed carrier which spans at least a portion of the first unlicensed band and at least a portion of the second unlicensed band, transmit, to the UE, an indication of the subset of regulation requirement parameters for uplink transmissions on the unlicensed carrier, and receive, from the UE, an uplink transmission using the subset of regulation requirement parameters. The communications manager 1115 may be an example of aspects of the communications manager 1410 described herein.

The actions performed by the communications manager 1115 as described herein may be implemented to realize one or more potential advantages. For example, enabling a single unlicensed carrier which spans multiple unlicensed bands to be associated with multiple sets of regulation requirement parameters may facilitate effective and efficient utilization of time and frequency resources in the context of unlicensed carriers. Accordingly, by improving resource utilization, the efficiency and reliability of wireless communications over unlicensed carriers may be reduced, and a quantity of UEs 115 which may be supported by unlicensed carriers may be increased.

By enabling a single unlicensed carrier which spans multiple unlicensed bands to be associated with multiple sets of regulation requirement parameters, a processor of the base station 105 (e.g., a processor controlling the receiver 1110, the communications manager 1115, the transmitter 1120, etc.) may reduce processing resources used for uplink communications. For example, by enabling the UE 115 to utilize an entire bandwidth of an unlicensed carrier, larger quantities of data may be transmitted for each uplink transmission, correspondingly reducing a number of times the processor ramps up processing power and turns on processing units to handle uplink reception.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
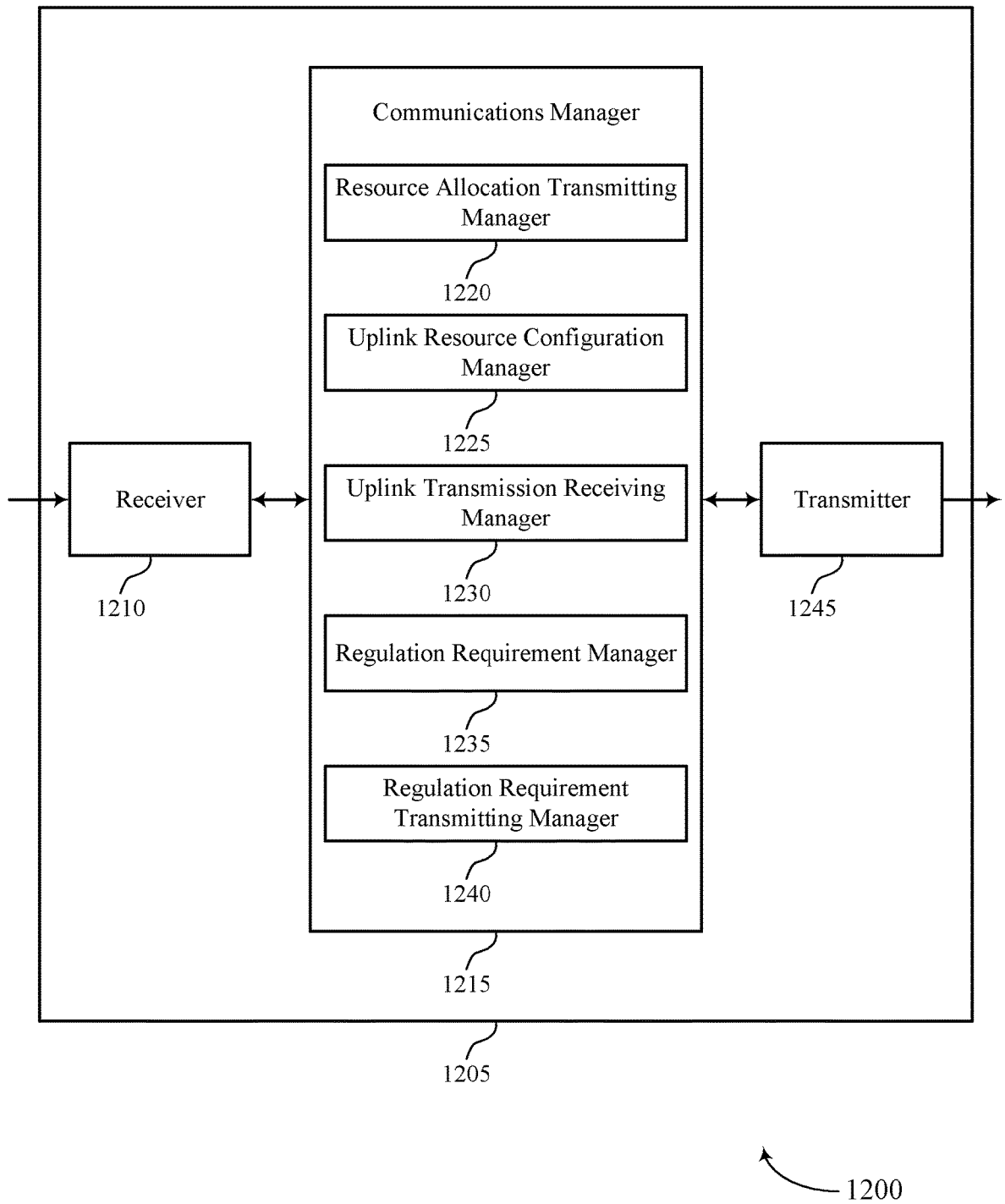

FIG. 12 shows a block diagram 1200 of a device 1205 that supports configurations for a carrier overlapping multiple unlicensed bands in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to configurations for a carrier overlapping multiple unlicensed bands, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a resource allocation transmitting manager 1220, an uplink resource configuration manager 1225, an uplink transmission receiving manager 1230, a regulation requirement manager 1235, and a regulation requirement transmitting manager 1240. The communications manager 1215 may be an example of aspects of the communications manager 1410 described herein.

The resource allocation transmitting manager 1220 may transmit, to a UE, a resource allocation for an unlicensed carrier which spans at least a portion of a first unlicensed band associated with a first set of regulation requirements and at least a portion of a second unlicensed band associated with a second set of regulation requirements.

The uplink resource configuration manager 1225 may transmit, to the UE, an uplink resource configuration indicating a set of frequency resources for an uplink transmission and a set of regulation requirement parameters for the uplink transmission.

The uplink transmission receiving manager 1230 may receive, from the UE, the uplink transmission using the set of regulation requirement parameters.

The regulation requirement manager 1235 may determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements.

The resource allocation transmitting manager 1220 may transmit, to a UE, a resource allocation for an unlicensed carrier which spans at least a portion of the first unlicensed band and at least a portion of the second unlicensed band.

The regulation requirement transmitting manager 1240 may transmit, to the UE, an indication of the subset of regulation requirement parameters for uplink transmissions on the unlicensed carrier.

The uplink transmission receiving manager 1230 may receive, from the UE, an uplink transmission using the subset of regulation requirement parameters.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
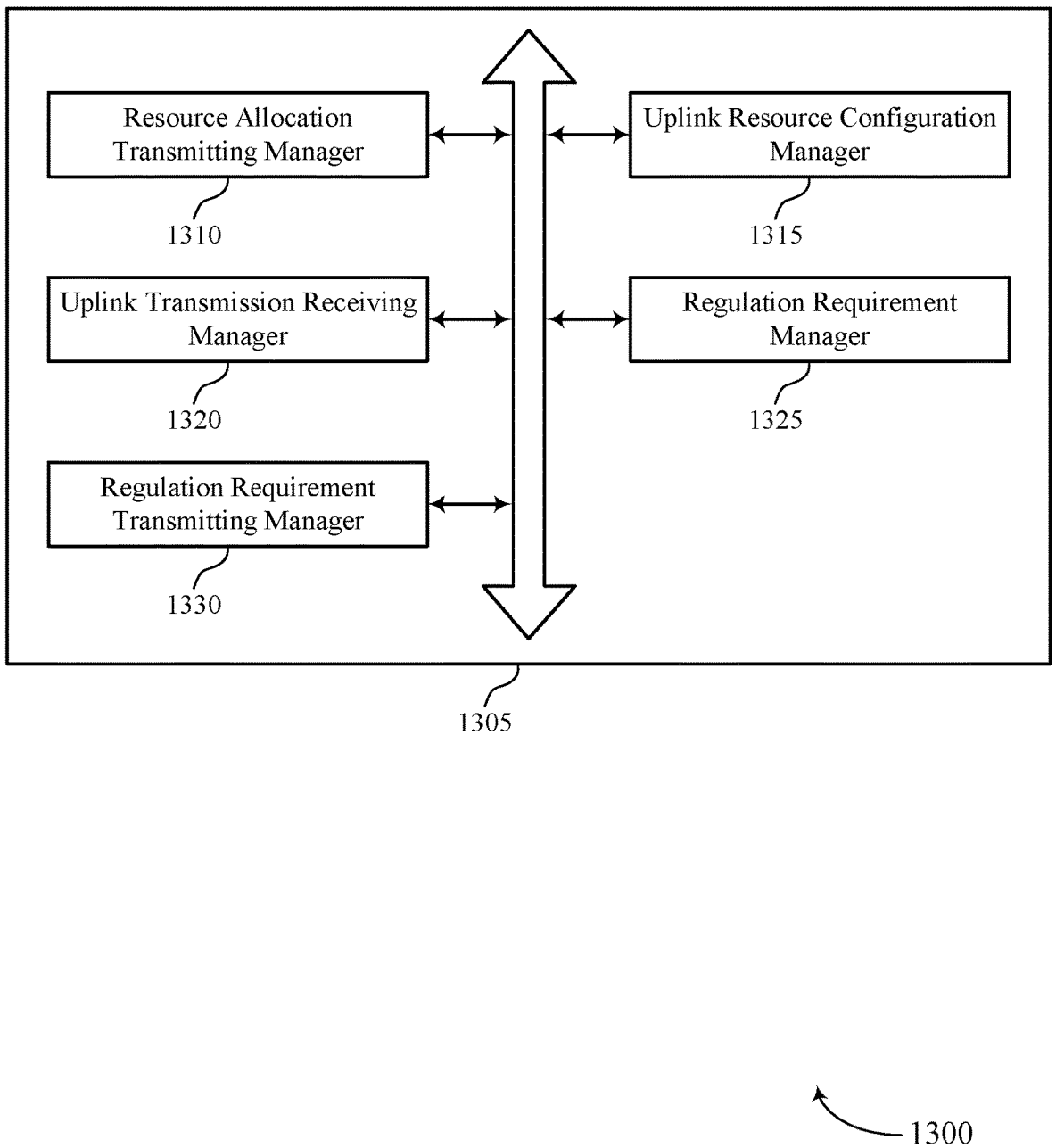
FIG. 13 shows a block diagram of a communications manager that supports configurations for a carrier overlapping multiple unlicensed bands in accordance with aspects of the present disclosure.

FIG. 13 shows a block diagram 1300 of a communications manager 1305 that supports configurations for a carrier overlapping multiple unlicensed bands in accordance with aspects of the present disclosure. The communications manager 1305 may be an example of aspects of a communications manager 1115, a communications manager 1215, or a communications manager 1410 described herein. The communications manager 1305 may include a resource allocation transmitting manager 1310, an uplink resource configuration manager 1315, an uplink transmission receiving manager 1320, a regulation requirement manager 1325, and a regulation requirement transmitting manager 1330. Each of these modules may communicate, directly or indirectly, with one another (e.g., via one or more buses).

The resource allocation transmitting manager 1310 may transmit, to a UE, a resource allocation for an unlicensed carrier which spans at least a portion of a first unlicensed band associated with a first set of regulation requirements and at least a portion of a second unlicensed band associated with a second set of regulation requirements. In some examples, the resource allocation transmitting manager 1310 may transmit, to a UE, a resource allocation for an unlicensed carrier which spans at least a portion of the first unlicensed band and at least a portion of the second unlicensed band.

The uplink resource configuration manager 1315 may transmit, to the UE, an uplink resource configuration indicating a set of frequency resources for an uplink transmission and a set of regulation requirement parameters for the uplink transmission.

The uplink transmission receiving manager 1320 may receive, from the UE, the uplink transmission using the set of regulation requirement parameters.

In some examples, the uplink transmission receiving manager 1320 may receive, from the UE, an uplink transmission using the subset of regulation requirement parameters. In some cases, the uplink transmission includes a dynamically configured physical uplink shared channel transmission, and where the uplink resource configuration includes an uplink grant. In some cases, the uplink transmission includes a semi-statically configured physical uplink shared channel transmission, and where the uplink resource configuration includes a configured grant or an activation downlink control information message. In some cases, the uplink transmission includes a an uplink control message or a reference signal, and where the uplink resource configuration includes a resource configuration message for the uplink control message or the reference signal.

The regulation requirement manager 1325 may determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements. In some cases, the set of regulation requirement parameters includes an EIRP, a PSD power value, an MPR value, a UE emission value, or any combination thereof. In some cases, the subset of regulation requirement parameters includes an EIRP, a PSD power value, an MPR value, a UE emission value, or any combination thereof. In some cases, the first unlicensed band, the second unlicensed band, or both, includes a U-NII band.

The regulation requirement transmitting manager 1330 may transmit, to the UE, an indication of the subset of regulation requirement parameters for uplink transmissions on the unlicensed carrier.

Figure 14:
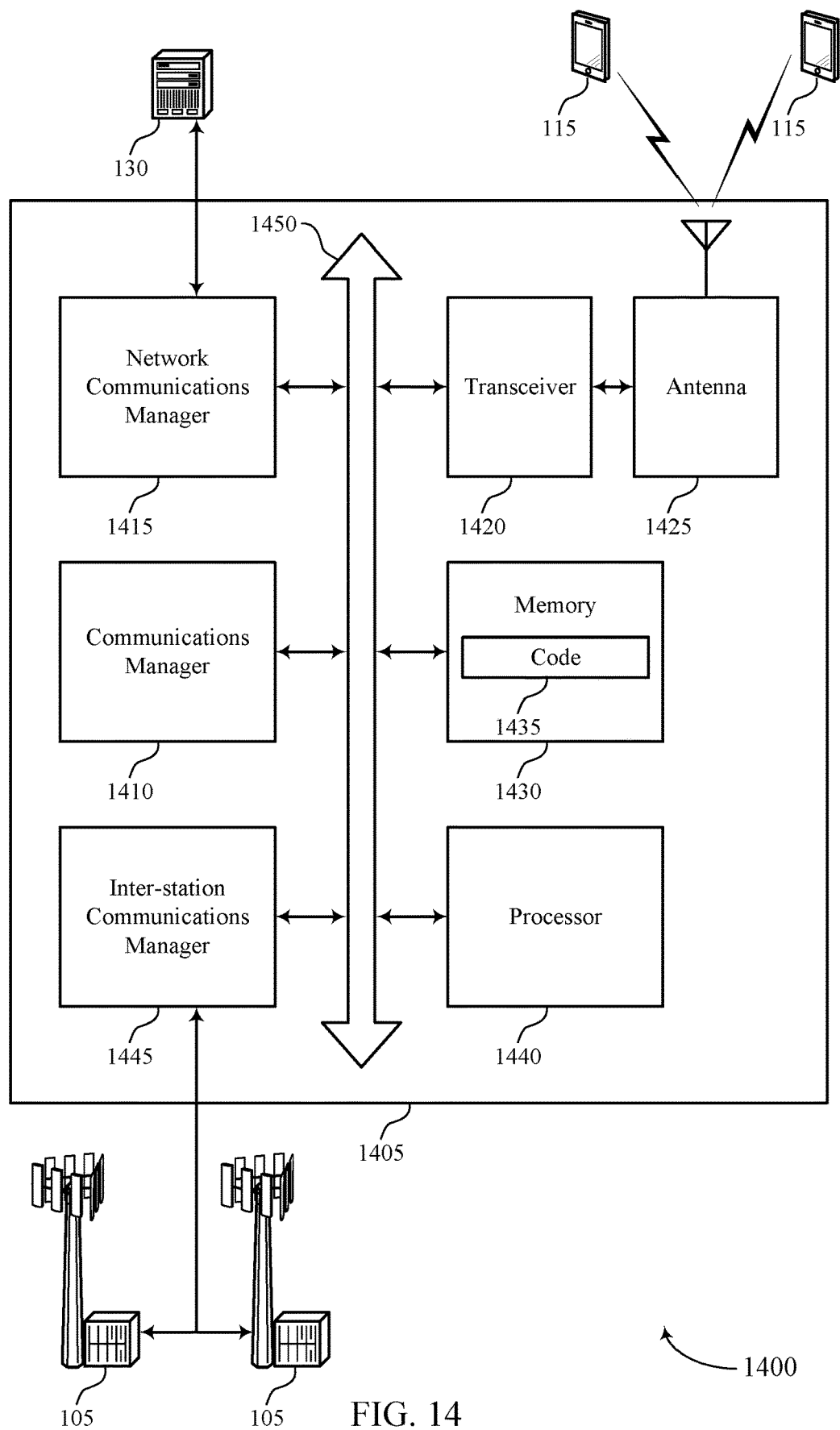
FIG. 14 shows a diagram of a system including a device that supports configurations for a carrier overlapping multiple unlicensed bands in accordance with aspects of the present disclosure.

FIG. 14 shows a diagram of a system 1400 including a device 1405 that supports configurations for a carrier overlapping multiple unlicensed bands in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a resource allocation for an unlicensed carrier which spans at least a portion of a first unlicensed band associated with a first set of regulation requirements and at least a portion of a second unlicensed band associated with a second set of regulation requirements, transmit, to the UE, an uplink resource configuration indicating a set of frequency resources for an uplink transmission and a set of regulation requirement parameters for the uplink transmission, and receive, from the UE, the uplink transmission using the set of regulation requirement parameters. The communications manager 1410 may also determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements, transmit, to a UE, a resource allocation for an unlicensed carrier which spans at least a portion of the first unlicensed band and at least a portion of the second unlicensed band, transmit, to the UE, an indication of the subset of regulation requirement parameters for uplink transmissions on the unlicensed carrier, and receive, from the UE, an uplink transmission using the subset of regulation requirement parameters.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting configurations for a carrier overlapping multiple unlicensed bands).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
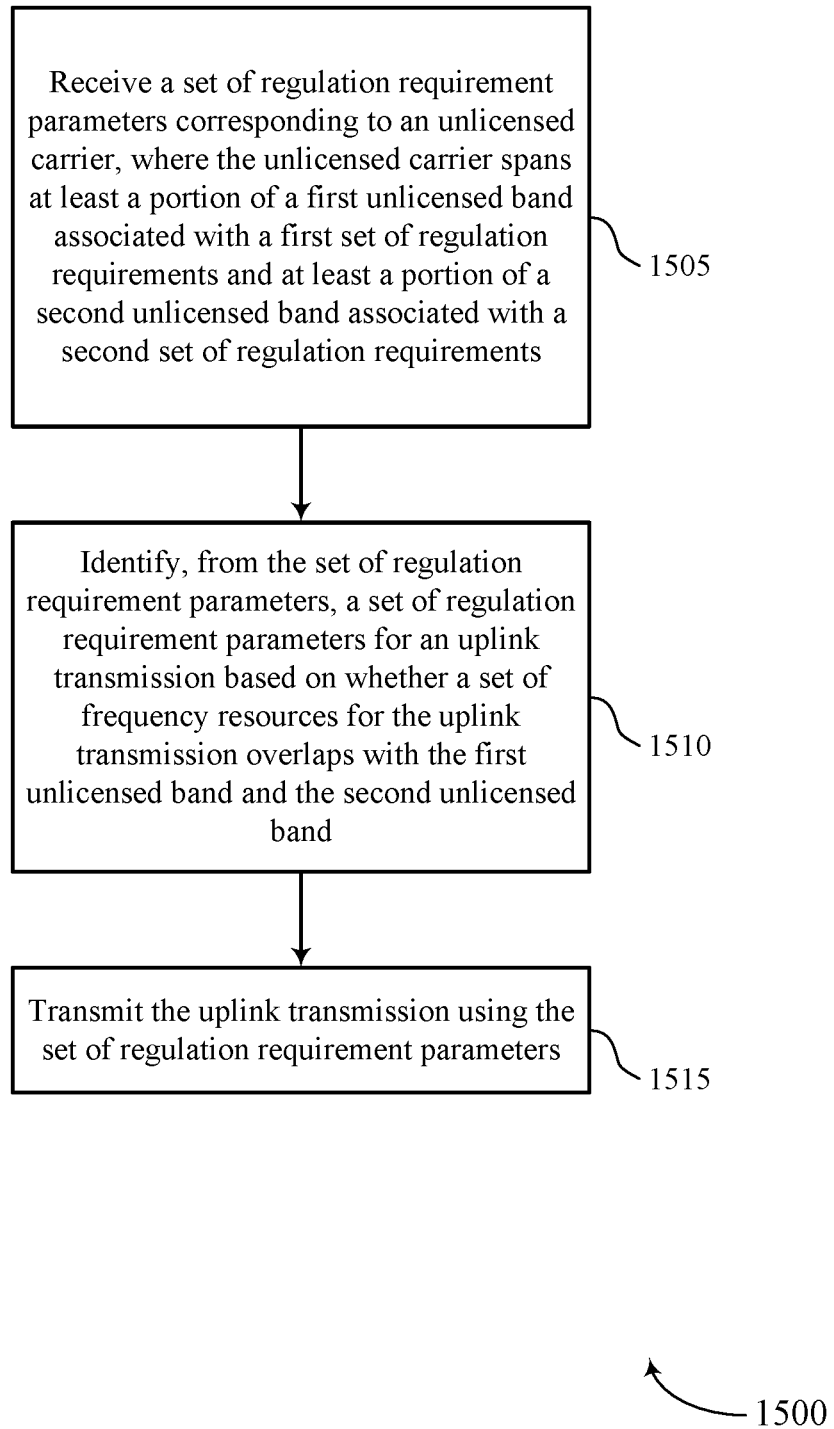
FIGS. 15 through 21 show flowcharts illustrating methods that support configurations for a carrier overlapping multiple unlicensed bands in accordance with aspects of the present disclosure.

FIG. 15 shows a flowchart illustrating a method 1500 that supports configurations for a carrier overlapping multiple unlicensed bands in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements. The operations of 1505 may be performed according to the methods described herein. In some examples, aspects of the operations of 1505 may be performed by a regulation requirement manager as described with reference to FIGS. 7 through 10.

At 1510, the UE may identify, from the set of regulation requirement parameters, a set of regulation requirement parameters for an uplink transmission based on whether a set of frequency resources for the uplink transmission overlaps with the first unlicensed band and the second unlicensed band. The operations of 1510 may be performed according to the methods described herein. In some examples, aspects of the operations of 1510 may be performed by a regulation requirement manager as described with reference to FIGS. 7 through 10.

At 1515, the UE may transmit the uplink transmission using the set of regulation requirement parameters. The operations of 1515 may be performed according to the methods described herein. In some examples, aspects of the operations of 1515 may be performed by an uplink transmission manager as described with reference to FIGS. 7 through 10.

Figure 16:
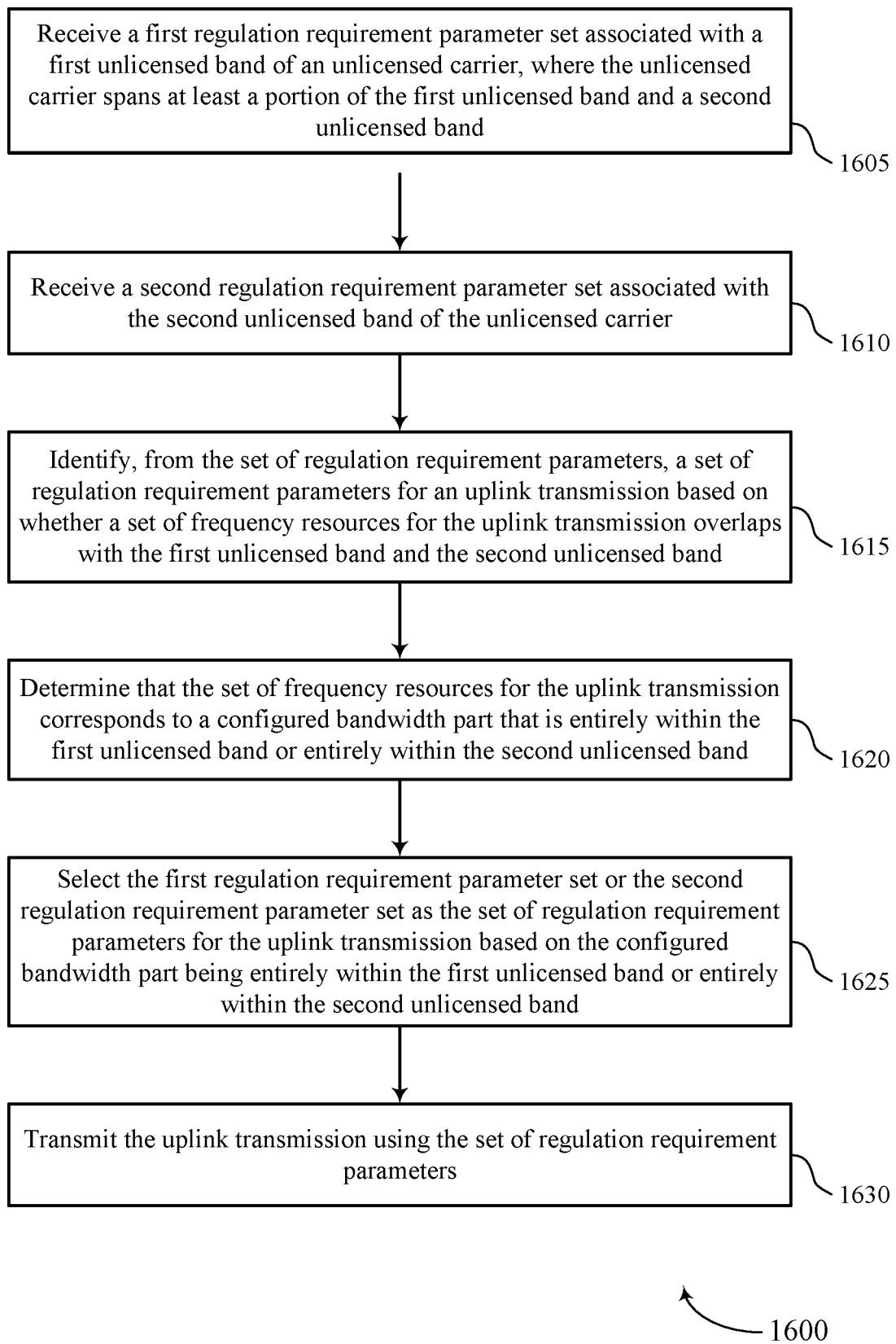

FIG. 16 shows a flowchart illustrating a method 1600 that supports configurations for a carrier overlapping multiple unlicensed bands in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a first regulation requirement parameter set associated with a first unlicensed band of an unlicensed carrier, where the unlicensed carrier spans at least a portion of the first unlicensed band and at least a portion of a second unlicensed band. The operations of 1605 may be performed according to the methods described herein. In some examples, aspects of the operations of 1605 may be performed by a regulation requirement receiving manager as described with reference to FIGS. 7 through 10.

At 1610, the UE may receive a second regulation requirement parameter set associated with the second unlicensed band of the unlicensed carrier. The operations of 1610 may be performed according to the methods described herein. In some examples, aspects of the operations of 1610 may be performed by a regulation requirement receiving manager as described with reference to FIGS. 7 through 10.

At 1615, the UE may identify, from the set of regulation requirement parameters, a set of regulation requirement parameters for an uplink transmission based on whether a set of frequency resources for the uplink transmission overlaps with the first unlicensed band and the second unlicensed band. The operations of 1615 may be performed according to the methods described herein. In some examples, aspects of the operations of 1615 may be performed by a regulation requirement manager as described with reference to FIGS. 7 through 10.

At 1620, the UE may determine that the set of frequency resources for the uplink transmission corresponds to a configured bandwidth part that is entirely within the first unlicensed band or entirely within the second unlicensed band. The operations of 1620 may be performed according to the methods described herein. In some examples, aspects of the operations of 1620 may be performed by a frequency resource manager as described with reference to FIGS. 7 through 10.

At 1625, the UE may select the first regulation requirement parameter set or the second regulation requirement parameter set as the set of regulation requirement parameters for the uplink transmission based on the configured bandwidth part being entirely within the first unlicensed band or entirely within the second unlicensed band. The operations of 1625 may be performed according to the methods described herein. In some examples, aspects of the operations of 1625 may be performed by a regulation requirement manager as described with reference to FIGS. 7 through 10.

At 1630, the UE may transmit the uplink transmission using the set of regulation requirement parameters. The operations of 1630 may be performed according to the methods described herein. In some examples, aspects of the operations of 1630 may be performed by an uplink transmission manager as described with reference to FIGS. 7 through 10.

Figure 17:
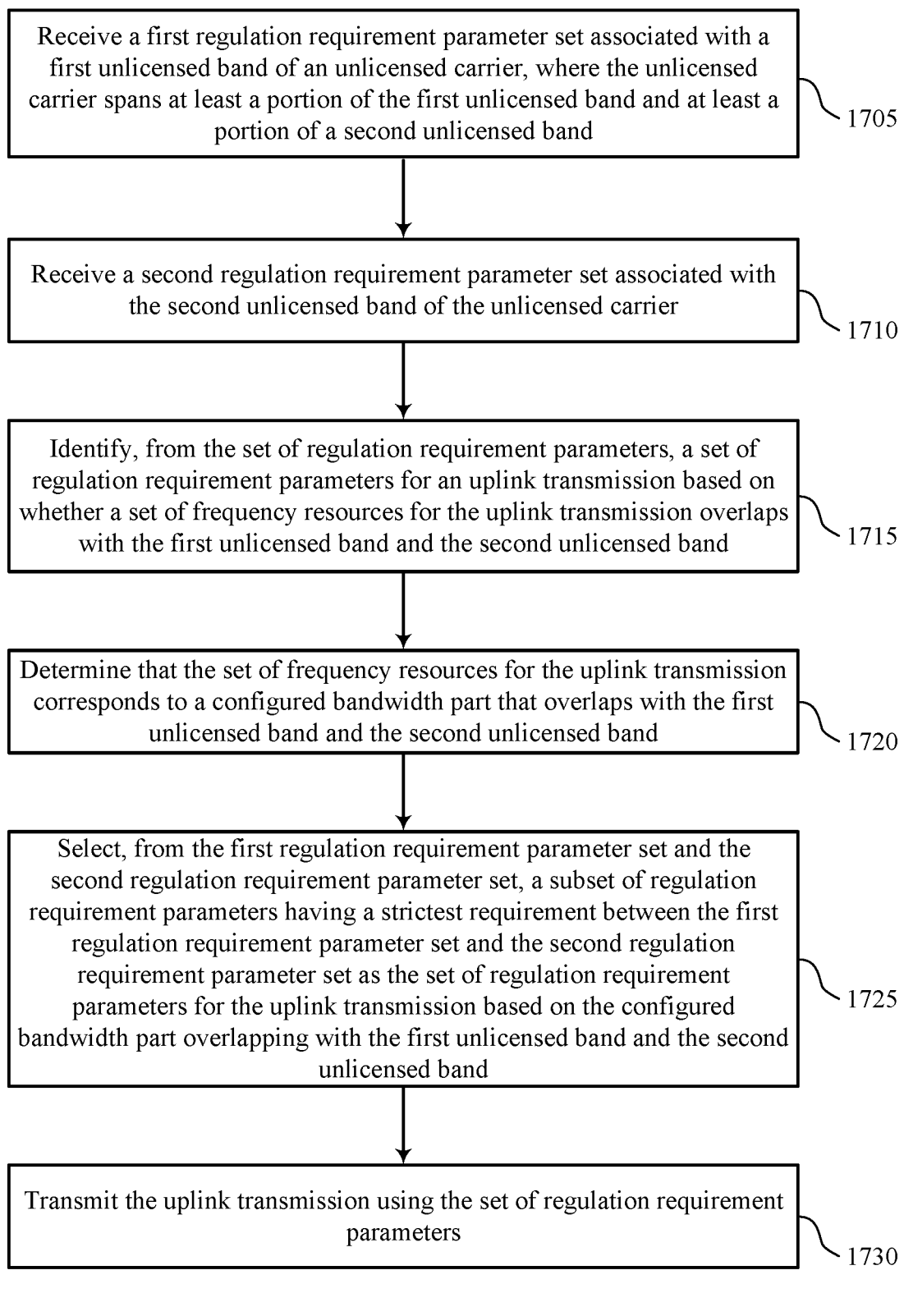

FIG. 17 shows a flowchart illustrating a method 1700 that supports configurations for a carrier overlapping multiple unlicensed bands in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a first regulation requirement parameter set associated with a first unlicensed band of an unlicensed carrier, where the unlicensed carrier spans at least a portion of the first unlicensed band and at least a portion of a second unlicensed band. The operations of 1705 may be performed according to the methods described herein. In some examples, aspects of the operations of 1705 may be performed by a regulation requirement receiving manager as described with reference to FIGS. 7 through 10.

At 1710, the UE may receive a second regulation requirement parameter set associated with the second unlicensed band of the unlicensed carrier. The operations of 1710 may be performed according to the methods described herein. In some examples, aspects of the operations of 1710 may be performed by a regulation requirement receiving manager as described with reference to FIGS. 7 through 10.

At 1715, the UE may identify, from the set of regulation requirement parameters, a set of regulation requirement parameters for an uplink transmission based on whether a set of frequency resources for the uplink transmission overlaps with the first unlicensed band and the second unlicensed band. The operations of 1715 may be performed according to the methods described herein. In some examples, aspects of the operations of 1715 may be performed by a regulation requirement manager as described with reference to FIGS. 7 through 10.

At 1720, the UE may determine that the set of frequency resources for the uplink transmission corresponds to a configured bandwidth part that overlaps with the first unlicensed band and the second unlicensed band. The operations of 1720 may be performed according to the methods described herein. In some examples, aspects of the operations of 1720 may be performed by a frequency resource manager as described with reference to FIGS. 7 through 10.

At 1725, the UE may select, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based on the configured bandwidth part overlapping with the first unlicensed band and the second unlicensed band. The operations of 1725 may be performed according to the methods described herein. In some examples, aspects of the operations of 1725 may be performed by a regulation requirement manager as described with reference to FIGS. 7 through 10.

At 1730, the UE may transmit the uplink transmission using the set of regulation requirement parameters. The operations of 1730 may be performed according to the methods described herein. In some examples, aspects of the operations of 1730 may be performed by an uplink transmission manager as described with reference to FIGS. 7 through 10.

Figure 18:
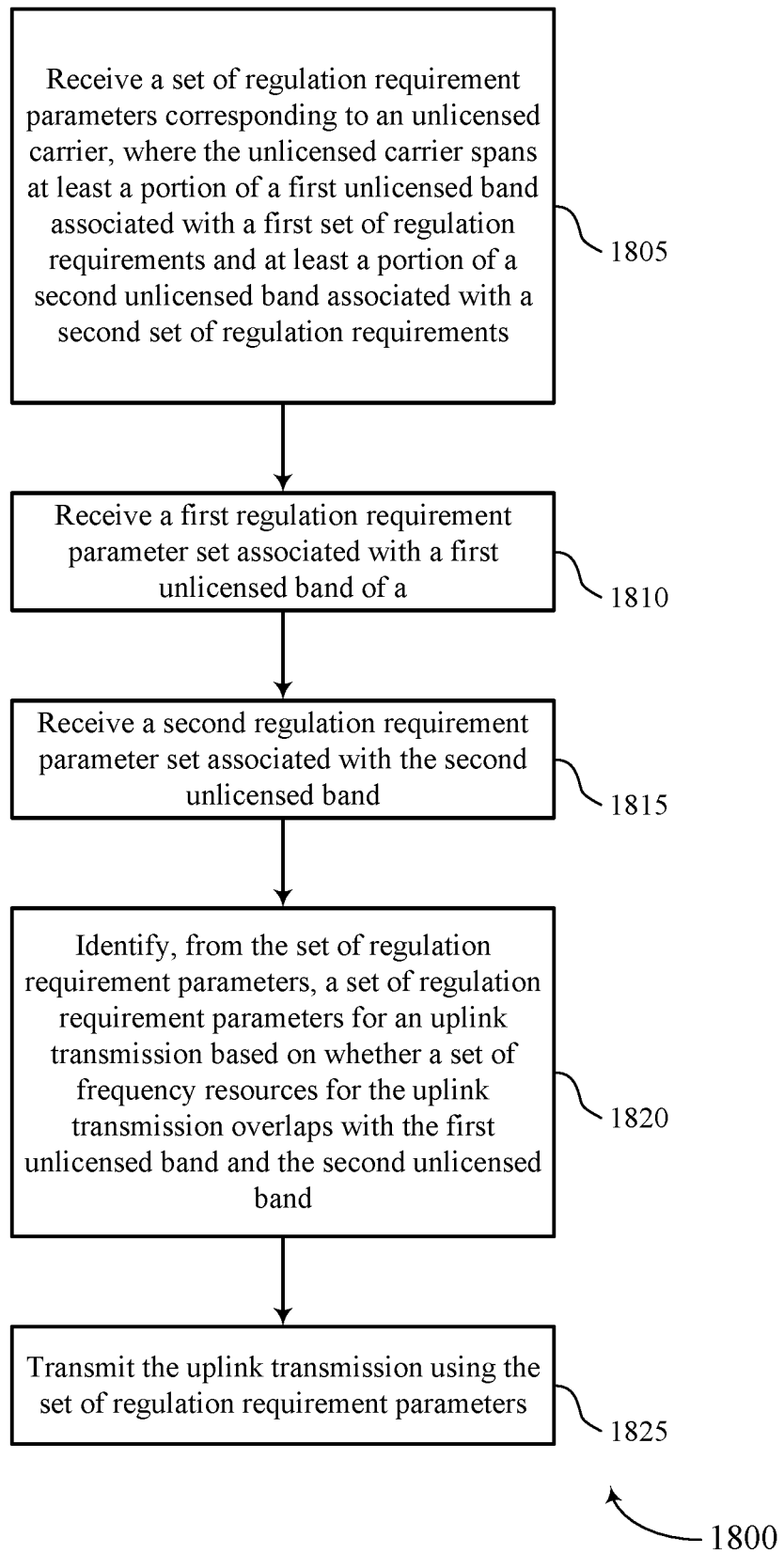

FIG. 18 shows a flowchart illustrating a method 1800 that supports configurations for a carrier overlapping multiple unlicensed bands in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive a set of regulation requirement parameters corresponding to an unlicensed carrier, where the unlicensed carrier spans at least a portion of a first unlicensed band associated with a first set of regulation requirements and at least a portion of a second unlicensed band associated with a second set of regulation requirements. The operations of 1805 may be performed according to the methods described herein. In some examples, aspects of the operations of 1805 may be performed by a regulation requirement manager as described with reference to FIGS. 7 through 10.

At 1810, the UE may receive a first regulation requirement parameter set associated with the first unlicensed band. The operations of 1810 may be performed according to the methods described herein. In some examples, aspects of the operations of 1810 may be performed by a regulation requirement receiving manager as described with reference to FIGS. 7 through 10.

At 1815, the UE may receive a second regulation requirement parameter set associated with the second unlicensed band. The operations of 1815 may be performed according to the methods described herein. In some examples, aspects of the operations of 1815 may be performed by a regulation requirement receiving manager as described with reference to FIGS. 7 through 10.

At 1820, the UE may identify, from the set of regulation requirement parameters, a set of regulation requirement parameters for an uplink transmission based on whether a set of frequency resources for the uplink transmission overlaps with the first unlicensed band and the second unlicensed band. The operations of 1820 may be performed according to the methods described herein. In some examples, aspects of the operations of 1820 may be performed by a regulation requirement manager as described with reference to FIGS. 7 through 10.

At 1825, the UE may transmit the uplink transmission using the set of regulation requirement parameters. The operations of 1825 may be performed according to the methods described herein. In some examples, aspects of the operations of 1825 may be performed by an uplink transmission manager as described with reference to FIGS. 7 through 10.

Figure 19:
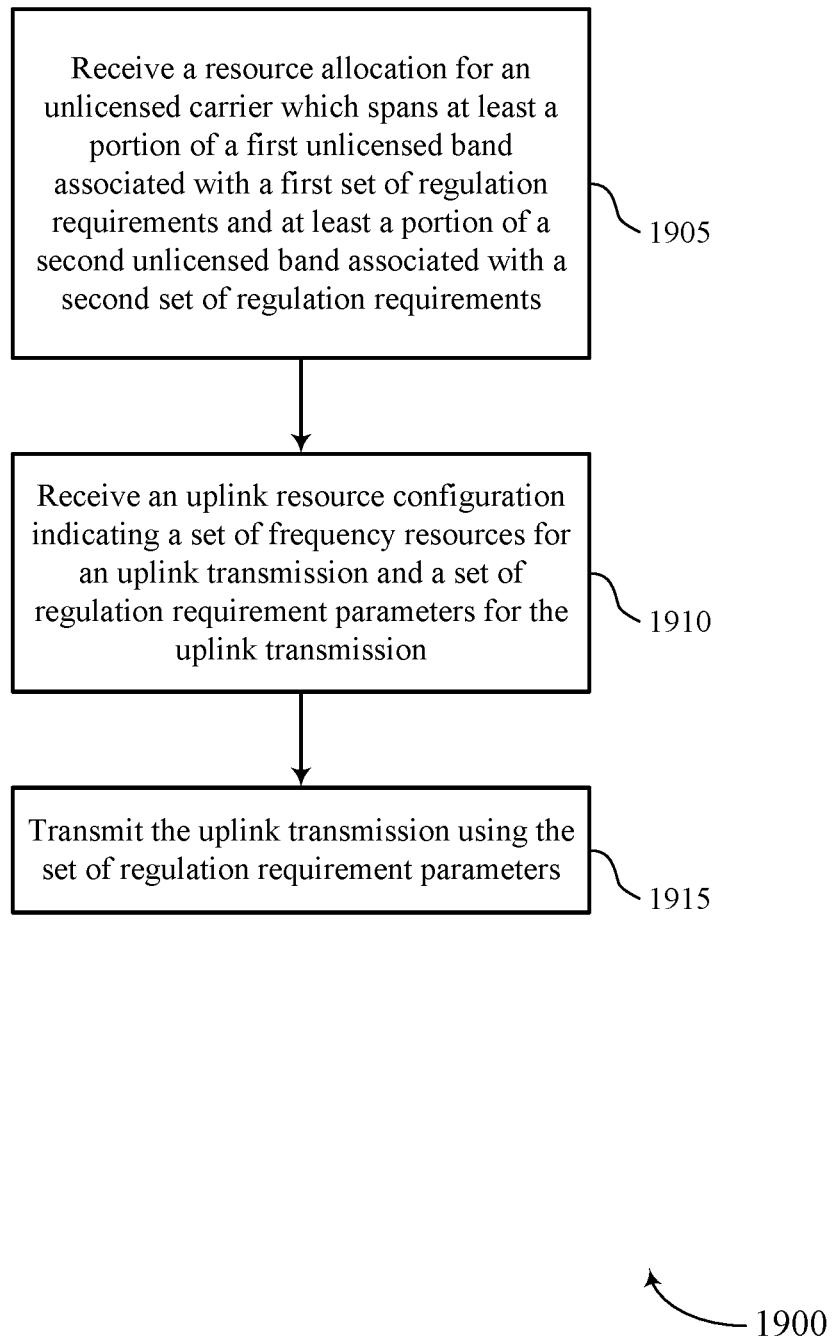

FIG. 19 shows a flowchart illustrating a method 1900 that supports configurations for a carrier overlapping multiple unlicensed bands in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive a resource allocation for an unlicensed carrier which spans at least a portion of a first unlicensed band associated with a first set of regulation requirements and at least a portion of a second unlicensed band associated with a second set of regulation requirements. The operations of 1905 may be performed according to the methods described herein. In some examples, aspects of the operations of 1905 may be performed by a resource allocation receiving manager as described with reference to FIGS. 7 through 10.

At 1910, the UE may receive an uplink resource configuration indicating a set of frequency resources for an uplink transmission and a set of regulation requirement parameters for the uplink transmission. The operations of 1910 may be performed according to the methods described herein. In some examples, aspects of the operations of 1910 may be performed by an uplink resource configuration manager as described with reference to FIGS. 7 through 10.

At 1915, the UE may transmit the uplink transmission using the set of regulation requirement parameters. The operations of 1915 may be performed according to the methods described herein. In some examples, aspects of the operations of 1915 may be performed by an uplink transmission manager as described with reference to FIGS. 7 through 10.

Figure 20:
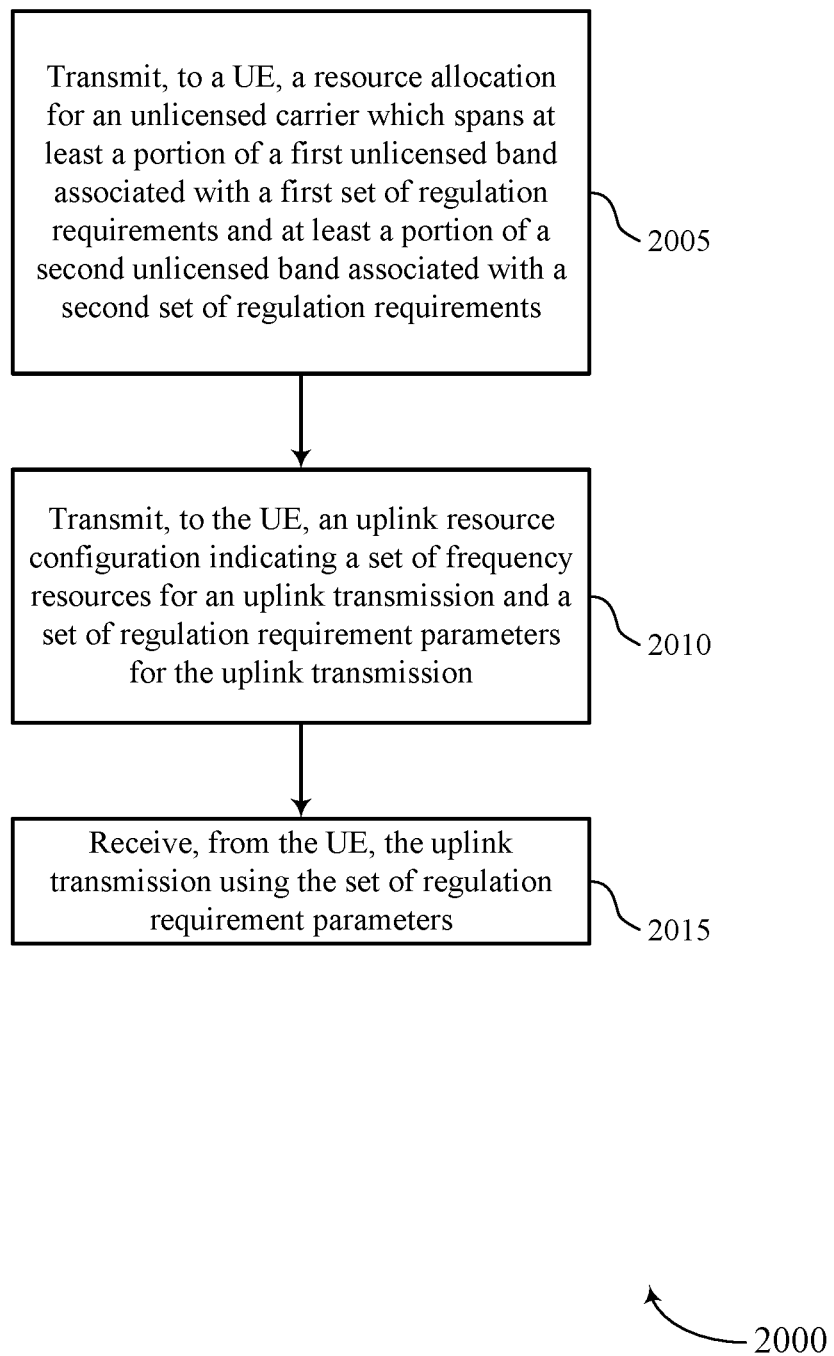

FIG. 20 shows a flowchart illustrating a method 2000 that supports configurations for a carrier overlapping multiple unlicensed bands in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a resource allocation for an unlicensed carrier which spans at least a portion of a first unlicensed band associated with a first set of regulation requirements and at least a portion of a second unlicensed band associated with a second set of regulation requirements. The operations of 2005 may be performed according to the methods described herein. In some examples, aspects of the operations of 2005 may be performed by a resource allocation transmitting manager as described with reference to FIGS. 11 through 14.

At 2010, the base station may transmit, to the UE, an uplink resource configuration indicating a set of frequency resources for an uplink transmission and a set of regulation requirement parameters for the uplink transmission. The operations of 2010 may be performed according to the methods described herein. In some examples, aspects of the operations of 2010 may be performed by an uplink resource configuration manager as described with reference to FIGS. 11 through 14.

At 2015, the base station may receive, from the UE, the uplink transmission using the set of regulation requirement parameters. The operations of 2015 may be performed according to the methods described herein. In some examples, aspects of the operations of 2015 may be performed by an uplink transmission receiving manager as described with reference to FIGS. 11 through 14.

Figure 21:
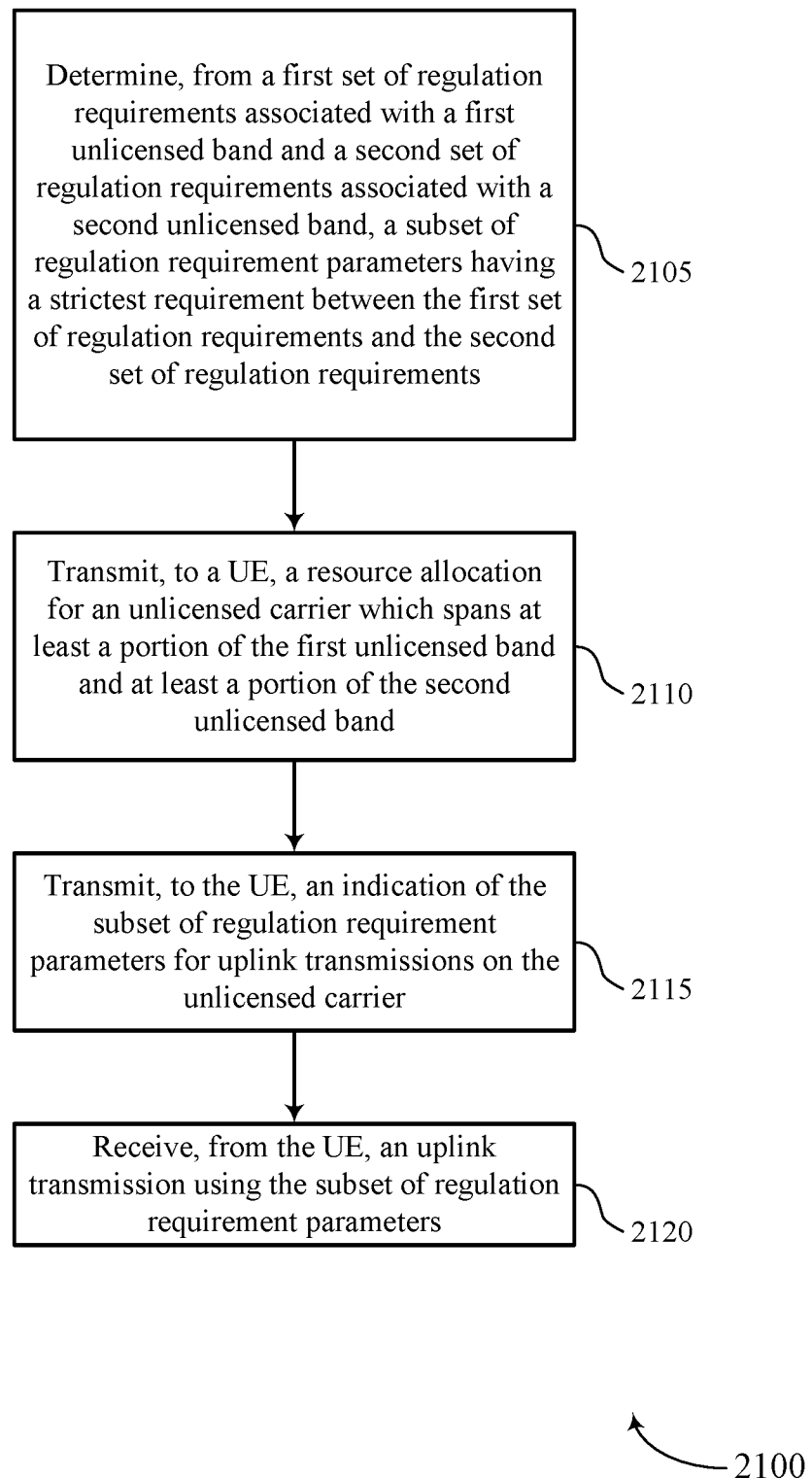

FIG. 21 shows a flowchart illustrating a method 2100 that supports configurations for a carrier overlapping multiple unlicensed bands in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may determine, from a first set of regulation requirements associated with a first unlicensed band and a second set of regulation requirements associated with a second unlicensed band, a subset of regulation requirement parameters having a strictest requirement between the first set of regulation requirements and the second set of regulation requirements. The operations of 2105 may be performed according to the methods described herein. In some examples, aspects of the operations of 2105 may be performed by a regulation requirement manager as described with reference to FIGS. 11 through 14.

At 2110, the base station may transmit, to a UE, a resource allocation for an unlicensed carrier which spans at least a portion of the first unlicensed band and at least a portion of the second unlicensed band. The operations of 2110 may be performed according to the methods described herein. In some examples, aspects of the operations of 2110 may be performed by a resource allocation transmitting manager as described with reference to FIGS. 11 through 14.

At 2115, the base station may transmit, to the UE, an indication of the subset of regulation requirement parameters for uplink transmissions on the unlicensed carrier. The operations of 2115 may be performed according to the methods described herein. In some examples, aspects of the operations of 2115 may be performed by a regulation requirement transmitting manager as described with reference to FIGS. 11 through 14.

At 2120, the base station may receive, from the UE, an uplink transmission using the subset of regulation requirement parameters. The operations of 2120 may be performed according to the methods described herein. In some examples, aspects of the operations of 2120 may be performed by an uplink transmission receiving manager as described with reference to FIGS. 11 through 14.

The following provides an overview of aspects of the present disclosure:

Aspect 1: A method for wireless communications at a UE, comprising: receiving a plurality of regulation requirement parameters corresponding to an unlicensed carrier, wherein the unlicensed carrier spans at least a portion of a first unlicensed band associated with a first set of regulation requirements and at least a portion of a second unlicensed band associated with a second set of regulation requirements; identifying, from the plurality of regulation requirement parameters, a set of regulation requirement parameters for an uplink transmission based at least in part on whether a set of frequency resources for the uplink transmission overlaps with the first unlicensed band and the second unlicensed band; and transmitting the uplink transmission using the set of regulation requirement parameters.

Aspect 2: The method of aspect 1, wherein receiving the plurality of regulation requirement parameters comprises: receiving a first regulation requirement parameter set associated with the first unlicensed band; and receiving a second regulation requirement parameter set associated with the second unlicensed band.

Aspect 3: The method of aspect 2, further comprising: determining that the set of frequency resources for the uplink transmission corresponds to a configured BWP that is entirely within the first unlicensed band or entirely within the second unlicensed band; and selecting the first regulation requirement parameter set or the second regulation requirement parameter set as the set of regulation requirement parameters for the uplink transmission based at least in part on the configured BWP being entirely within the first unlicensed band or entirely within the second unlicensed band.

Aspect 4: The method of any of aspects 2 through 3, further comprising: determining that the set of frequency resources for the uplink transmission corresponds to a configured BWP that overlaps with the first unlicensed band and the second unlicensed band; and selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based at least in part on the configured BWP overlapping with the first unlicensed band and the second unlicensed band.

Aspect 5: The method of any of aspects 2 through 4, further comprising: determining that the set of frequency resources for the uplink transmission is entirely within the first unlicensed band or entirely within the second unlicensed band; and selecting the first regulation requirement parameter set or the second regulation requirement parameter set as the set of regulation requirement parameters for the uplink transmission based at least in part on the set of frequency resources for the uplink transmission being entirely within the first unlicensed band or entirely within the second unlicensed band.

Aspect 6: The method of any of aspects 2 through 5, further comprising: determining that the set of frequency resources for the uplink transmission overlaps with the first unlicensed band and the second unlicensed band; and selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based at least in part on the set of frequency resources for the uplink transmission overlapping with the first unlicensed band and the second unlicensed band.

Aspect 7: The method of any of aspects 1 through 6, wherein receiving the plurality of regulation requirement parameters comprises: receiving a first regulation requirement parameter set associated with a first configured BWP of the unlicensed carrier; and receiving a second regulation requirement parameter set associated with a second configured BWP of the unlicensed carrier.

Aspect 8: The method of aspect 7, further comprising: determining that the set of frequency resources for the uplink transmission corresponds to the first configured BWP or the second configured BWP; and selecting the first regulation requirement parameter set or the second regulation requirement parameter set as the set of regulation requirement parameters for the uplink transmission based at least in part on the set of frequency resources for the uplink transmission corresponding to the first configured BWP or the second configured BWP.

Aspect 9: The method of any of aspects 7 through 8, further comprising: determining that the set of frequency resources for the uplink transmission is entirely within the first unlicensed band or entirely within the second unlicensed band; and selecting, from the first regulation requirement parameter set and the second regulation requirement parameter set, a regulation requirement parameter set corresponding to the first unlicensed band or the second unlicensed band as the set of regulation requirement parameters for the uplink transmission based at least in part on the set of frequency resources for the uplink transmission being entirely within the first unlicensed band or entirely within the second unlicensed band.

Aspect 10: The method of any of aspects 7 through 9, further comprising: determining that the set of frequency resources for the uplink transmission overlaps with the first unlicensed band and the second unlicensed band; and selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based at least in part on the set of frequency resources for the uplink transmission overlapping with the first unlicensed band and the second unlicensed band.

Aspect 11: The method of any of aspects 1 through 10, further comprising: receiving, from a base station, a SIB comprising an indication of the plurality of regulation requirement parameters.

Aspect 12: The method of any of aspects 1 through 11, wherein the set of regulation requirement parameters comprises an EIRP value, a PSD power value, an MPR value, a UE emission value, or any combination thereof.

Aspect 13: The method of any of aspects 1 through 12, wherein the first unlicensed band, the second unlicensed band, or both, comprises a U-NII band.

Aspect 14: A method for wireless communications at a UE, comprising: receiving a resource allocation for an unlicensed carrier which spans at least a portion of a first unlicensed band associated with a first set of regulation requirements and at least a portion of a second unlicensed band associated with a second set of regulation requirements; receiving an uplink resource configuration indicating a set of frequency resources for an uplink transmission and a set of regulation requirement parameters for the uplink transmission; and transmitting the uplink transmission using the set of regulation requirement parameters.

Aspect 15: The method of aspect 14, wherein the uplink transmission comprises a dynamically configured PUSCH transmission, and the uplink resource configuration comprises an uplink grant.

Aspect 16: The method of any of aspects 14 through 15, wherein the uplink transmission comprises a semi-statically configured PUSCH transmission, and the uplink resource configuration comprises a configured grant or an activation DCI message.

Aspect 17: The method of any of aspects 14 through 16, wherein the uplink transmission comprises an uplink control message or a reference signal, and the uplink resource configuration comprises a resource configuration message for the uplink control message or the reference signal.

Aspect 18: The method of any of aspects 14 through 17, wherein the set of regulation requirement parameters comprises an EIRP value, a PSD power value, an MPR value, a UE emission value, or any combination thereof.

Aspect 19: The method of any of aspects 14 through 18, wherein the first unlicensed band, the second unlicensed band, or both, comprises aa U-NII band.

Aspect 20: A method for wireless communications at a base station, comprising: transmitting, to a UE, a resource allocation for an unlicensed carrier which spans at least a portion of a first unlicensed band associated with a first set of regulation requirements and at least a portion of a second unlicensed band associated with a second set of regulation requirements; transmitting, to the UE, an uplink resource configuration indicating a set of frequency resources for an uplink transmission and a set of regulation requirement parameters for the uplink transmission; and receiving, from the UE, the uplink transmission using the set of regulation requirement parameters.

Aspect 21: The method of aspect 20, wherein the uplink transmission comprises a dynamically configured PUSCH transmission, and the uplink resource configuration comprises an uplink grant.

Aspect 22: The method of any of aspects 20 through 21, wherein the uplink transmission comprises a semi-statically configured PUSCH transmission, and the uplink resource configuration comprises a configured grant or an activation DCI message.

Aspect 23: The method of any of aspects 20 through 22, wherein the uplink transmission comprises a an uplink control message or a reference signal, and the uplink resource configuration comprises a resource configuration message for the uplink control message or the reference signal.

Aspect 24: The method of any of aspects 20 through 23, wherein the set of regulation requirement parameters comprises an EIRP value, a PSD power value, an MPR value, a UE emission value, or any combination thereof.

Aspect 25: The method of any of aspects 20 through 24, wherein the first unlicensed band, the second unlicensed band, or both, comprises a U-NII band.

Aspect 26: A method for wireless communications at a base station, comprising: determining, from a first set of regulation requirements associated with a first unlicensed band and a second set of regulation requirements associated with a second unlicensed band, a subset of regulation requirement parameters having a strictest requirement between the first set of regulation requirements and the second set of regulation requirements; transmitting, to a UE, a resource allocation for an unlicensed carrier which spans at least a portion of the first unlicensed band and at least a portion of the second unlicensed band; transmitting, to the UE, an indication of the subset of regulation requirement parameters for uplink transmissions on the unlicensed carrier; and receiving, from the UE, an uplink transmission using the subset of regulation requirement parameters.

Aspect 27: The method of aspect 26, wherein the subset of regulation requirement parameters comprises an EIRP value, a PSD power value, an MPR value, a UE emission value, or any combination thereof.

Aspect 28: The method of any of aspects 26 through 27, wherein the first unlicensed band, the second unlicensed band, or both, comprises a U-NII band.

Aspect 29: An apparatus for wireless communications at a UE, comprising a processor; memory coupled with the processor; and instructions stored in the memory and executable by the processor to cause the apparatus to perform a method of any of aspects 1 through 13.

Aspect 30: An apparatus for wireless communications at a UE, comprising at least one means for performing a method of any of aspects 1 through 13.

Aspect 31: A non-transitory computer-readable medium storing code for wireless communications at a UE, the code comprising instructions executable by a processor to perform a method of any of aspects 1 through 13.

Aspect 32: An apparatus for wireless communications at a UE, comprising a processor; memory coupled with the processor; and instructions stored in the memory and executable by the processor to cause the apparatus to perform a method of any of aspects 14 through 19.

Aspect 33: An apparatus for wireless communications at a UE, comprising at least one means for performing a method of any of aspects 14 through 19.

Aspect 34: A non-transitory computer-readable medium storing code for wireless communications at a UE, the code comprising instructions executable by a processor to perform a method of any of aspects 14 through 19.

Aspect 35: An apparatus for wireless communications at a base station, comprising a processor; memory coupled with the processor; and instructions stored in the memory and executable by the processor to cause the apparatus to perform a method of any of aspects 20 through 25.

Aspect 36: An apparatus for wireless communications at a base station, comprising at least one means for performing a method of any of aspects 20 through 25.

Aspect 37: A non-transitory computer-readable medium storing code for wireless communications at a base station, the code comprising instructions executable by a processor to perform a method of any of aspects 20 through 25.

Aspect 38: An apparatus for wireless communications at a base station, comprising a processor; memory coupled with the processor; and instructions stored in the memory and executable by the processor to cause the apparatus to perform a method of any of aspects 26 through 28.

Aspect 39: An apparatus for wireless communications at a base station, comprising at least one means for performing a method of any of aspects 26 through 28.

Aspect 40: A non-transitory computer-readable medium storing code for wireless communications at a base station, the code comprising instructions executable by a processor to perform a method of any of aspects 26 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a plurality of regulation requirement parameters corresponding to an unlicensed carrier, wherein the unlicensed carrier spans at least a portion of a first unlicensed band associated with a first set of regulation requirements and at least a portion of a second unlicensed band associated with a second set of regulation requirements;
    wherein the plurality of regulation requirement parameters comprise a first regulation requirement parameter set associated with the first unlicensed band and a second regulation requirement parameter set associated with the second unlicensed band;
    identifying, from the plurality of regulation requirement parameters, a set of regulation requirement parameters for an uplink transmission based at least in part on whether a set of frequency resources for the uplink transmission overlaps with the first unlicensed band and the second unlicensed band;
    wherein identifying the set of regulation requirement parameters further comprises:
        determining whether the set of frequency resources for the uplink transmission overlaps with the first unlicensed band and the second unlicensed band; and
        selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission, based at least in part on the set of frequency resources for the uplink transmission overlapping with the first unlicensed band and the second unlicensed band; and
    transmitting the uplink transmission using the set of regulation requirement parameters.

2. The method of claim 1, further comprising:
    determining that the set of frequency resources for the uplink transmission corresponds to a configured bandwidth part that is entirely within the first unlicensed band or entirely within the second unlicensed band; and
    selecting the first regulation requirement parameter set or the second regulation requirement parameter set as the set of regulation requirement parameters for the uplink transmission based at least in part on the configured bandwidth part being entirely within the first unlicensed band or entirely within the second unlicensed band.

3. The method of claim 1, further comprising:
    determining that the set of frequency resources for the uplink transmission corresponds to a configured bandwidth part that overlaps with the first unlicensed band and the second unlicensed band; and
    selecting, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based at least in part on the configured bandwidth part overlapping with the first unlicensed band and the second unlicensed band.

4. The method of claim 1, further comprising:
    determining that the set of frequency resources for the uplink transmission is entirely within the first unlicensed band or entirely within the second unlicensed band; and
    selecting the first regulation requirement parameter set or the second regulation requirement parameter set as the set of regulation requirement parameters for the uplink transmission based at least in part on the set of frequency resources for the uplink transmission being entirely within the first unlicensed band or entirely within the second unlicensed band.

5. The method of claim 1, wherein the first regulation requirement parameter set is associated with a first configured bandwidth part of the unlicensed carrier and the second regulation requirement parameter set is associated with a second configured bandwidth part of the unlicensed carrier.

6. The method of claim 5, further comprising:
    determining that the set of frequency resources for the uplink transmission corresponds to the first configured bandwidth part or the second configured bandwidth part; and
    selecting the first regulation requirement parameter set or the second regulation requirement parameter set as the set of regulation requirement parameters for the uplink transmission based at least in part on the set of frequency resources for the uplink transmission corresponding to the first configured bandwidth part or the second configured bandwidth part.

7. The method of claim 5, further comprising:
determining that the set of frequency resources for the uplink transmission is entirely within the first unlicensed band or entirely within the second unlicensed band; and
selecting, from the first regulation requirement parameter set and the second regulation requirement parameter set, a regulation requirement parameter set corresponding to the first unlicensed band or the second unlicensed band as the set of regulation requirement parameters for the uplink transmission based at least in part on the set of frequency resources for the uplink transmission being entirely within the first unlicensed band or entirely within the second unlicensed band.

8. The method of claim 1, further comprising:
receiving, from a base station, a system information block comprising an indication of the plurality of regulation requirement parameters.

9. The method of claim 1, wherein the set of regulation requirement parameters comprises an effective isotropically radiated power value, a power spectral density power value, a maximum power reduction value, a UE emission value, or any combination thereof.

10. The method of claim 1, wherein the first unlicensed band, the second unlicensed band, or both, comprises an Unlicensed National Information Infrastructure (U-NII) band.

11. A method for wireless communications at a user equipment (UE), comprising:
receiving a resource allocation for an unlicensed carrier which spans at least a portion of a first unlicensed band associated with a first set of regulation requirements and at least a portion of a second unlicensed band associated with a second set of regulation requirements;
receiving an uplink resource configuration indicating a set of frequency resources for an uplink transmission and a set of regulation requirement parameters for the uplink transmission;
wherein the set of regulation requirement parameters is selected, from a first set of regulation requirement parameter set associated with the first unlicensed band and a second regulation requirement parameter set associated with the second unlicensed band, as a subset of regulation requirement parameters having a strictest requirement between the first regulation requirement parameter set and the second regulation requirement parameter set, based on whether the set of frequency resources for the uplink transmission overlaps with the first unlicensed band and the second unlicensed band; and
transmitting the uplink transmission using the set of regulation requirement parameters.

12. The method of claim 11, wherein the uplink transmission comprises a dynamically configured physical uplink shared channel transmission, and wherein the uplink resource configuration comprises an uplink grant.

13. The method of claim 11, wherein the uplink transmission comprises a semi-statically configured physical uplink shared channel transmission, and wherein the uplink resource configuration comprises a configured grant or an activation downlink control information message.

14. The method of claim 11, wherein the uplink transmission comprises an uplink control message or a reference signal, and wherein the uplink resource configuration comprises a resource configuration message for the uplink control message or the reference signal.

15. The method of claim 11, wherein the set of regulation requirement parameters comprises an effective isotropically radiated power value, a power spectral density power value, a maximum power reduction value, a UE emission value, or any combination thereof.

16. The method of claim 11, wherein the first unlicensed band, the second unlicensed band, or both, comprises an Unlicensed National Information Infrastructure (U-NII) band.

17. An apparatus for wireless communications at a user equipment (UE), comprising:
a processor,
memory coupled with the processor; and
instructions stored in the memory and executable by the processor to cause the apparatus to:
receive a plurality of regulation requirement parameters corresponding to an unlicensed carrier, wherein the unlicensed carrier spans at least a portion of a first unlicensed band associated with a first set of regulation requirements and at least a portion of a second unlicensed band associated with a second set of regulation requirements;
wherein the plurality of regulation requirement parameters comprise a first regulation requirement parameter set associated with the first unlicensed band and a second regulation requirement parameter set associated with the second unlicensed band;
identify, from the plurality of regulation requirement parameters, a set of regulation requirement parameters for an uplink transmission based at least in part on whether a set of frequency resources for the uplink transmission overlaps with the first unlicensed band and the second unlicensed band;
wherein the instructions to identify the set of regulation requirement parameters are executable by the processor to cause the apparatus to:
determine whether the set of frequency resources for the uplink transmission overlaps with the first unlicensed band and the second unlicensed band; and
select, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission, based at least in part on the set of frequency resources for the uplink transmission overlapping with the first unlicensed band and the second unlicensed band; and
transmit the uplink transmission using the set of regulation requirement parameters.

18. The apparatus of claim 17, wherein the instructions are further executable by the processor to cause the apparatus to:
determine that the set of frequency resources for the uplink transmission corresponds to a configured bandwidth part that is entirely within the first unlicensed band or entirely within the second unlicensed band; and
select the first regulation requirement parameter set or the second regulation requirement parameter set as the set of regulation requirement parameters for the uplink transmission based at least in part on the configured bandwidth part being entirely within the first unlicensed band or entirely within the second unlicensed band.

19. The apparatus of claim 17, wherein the instructions are further executable by the processor to cause the apparatus to:
- determine that the set of frequency resources for the uplink transmission corresponds to a configured bandwidth part that overlaps with the first unlicensed band and the second unlicensed band; and
- select, from the first regulation requirement parameter set and the second regulation requirement parameter set, a subset of regulation requirement parameters having a strictest requirement between the first regulation requirement parameter set and the second regulation requirement parameter set as the set of regulation requirement parameters for the uplink transmission based at least in part on the configured bandwidth part overlapping with the first unlicensed band and the second unlicensed band.

20. The apparatus of claim 17, wherein the instructions are further executable by the processor to cause the apparatus to:
- determine that the set of frequency resources for the uplink transmission is entirely within the first unlicensed band or entirely within the second unlicensed band; and
- select the first regulation requirement parameter set or the second regulation requirement parameter set as the set of regulation requirement parameters for the uplink transmission based at least in part on the set of frequency resources for the uplink transmission being entirely within the first unlicensed band or entirely within the second unlicensed band.

21. The apparatus of claim 17, wherein the first regulation requirement parameter set is associated with a first configured bandwidth part of the unlicensed carrier and the second regulation requirement parameter set is associated with a second configured bandwidth part of the unlicensed carrier.

22. An apparatus for wireless communications at a user equipment (UE), comprising:
- a processor,
- memory coupled with the processor; and
- instructions stored in the memory and executable by the processor to cause the apparatus to:
  - receive a resource allocation for an unlicensed carrier which spans at least a portion of a first unlicensed band associated with a first set of regulation requirements and at least a portion of a second unlicensed band associated with a second set of regulation requirements;
  - receive an uplink resource configuration indicating a set of frequency resources for an uplink transmission and a set of regulation requirement parameters for the uplink transmission, wherein the set of frequency resources for the uplink transmission overlaps with the first unlicensed band and the second unlicensed band;
  - wherein the set of regulation requirement parameters is selected, from a first set of regulation requirement parameter set associated with the first unlicensed band and a second regulation requirement parameter set associated with the second unlicensed band, as a subset of regulation requirement parameters having a strictest requirement between the first regulation requirement parameter set and the second regulation requirement parameter set, based on whether the set of frequency resources for the uplink transmission overlaps with the first unlicensed band and the second unlicensed band; and
  - transmit the uplink transmission using the set of regulation requirement parameters.

23. The apparatus of claim 22, wherein the uplink transmission comprises a dynamically configured physical uplink shared channel transmission, and wherein the uplink resource configuration comprises an uplink grant.

24. The apparatus of claim 22, wherein the uplink transmission comprises a semi-statically configured physical uplink shared channel transmission, and wherein the uplink resource configuration comprises a configured grant or an activation downlink control information message.

25. The apparatus of claim 22, wherein the uplink transmission comprises an uplink control message or a reference signal, and wherein the uplink resource configuration comprises a resource configuration message for the uplink control message or the reference signal.

* * * * *